(12) United States Patent
Shekar et al.

(10) Patent No.: US 9,330,474 B1
(45) Date of Patent: May 3, 2016

(54) DISTINGUISHING BETWEEN STOCK KEEPING UNITS USING A PHYSICAL DIMENSION OF A REGION DEPICTED IN AN IMAGE

(71) Applicants: Bharathi Shekar, Bangalore (IN); Sri Kaushik Pavani, Chennai (IN); Anshul Garg, Haryana (IN)

(72) Inventors: Bharathi Shekar, Bangalore (IN); Sri Kaushik Pavani, Chennai (IN); Anshul Garg, Haryana (IN)

(73) Assignee: RICOH CO., LTD., Tokyo (JP)

( * ) Notice: Subject to any disclaimer, the term of this patent is extended or adjusted under 35 U.S.C. 154(b) by 10 days.

(21) Appl. No.: 14/582,049

(22) Filed: Dec. 23, 2014

(51) Int. Cl.
*G06K 9/46* (2006.01)
*G06T 7/60* (2006.01)
*G06T 7/00* (2006.01)
*G06K 9/20* (2006.01)
*G06K 9/00* (2006.01)
*G06K 9/62* (2006.01)

(52) U.S. Cl.
CPC .............. *G06T 7/60* (2013.01); *G06K 9/00671* (2013.01); *G06K 9/2081* (2013.01); *G06K 9/46* (2013.01); *G06K 9/6201* (2013.01); *G06T 7/0081* (2013.01); *G06K 2009/6213* (2013.01)

(58) Field of Classification Search
CPC .............. G01B 11/24; G06K 2209/40; G06K 9/00201; G06K 9/00771; G06K 9/00691; G06K 9/6202; G06K 9/6203; G06T 7/0065; H04N 13/0007; H04N 2101/00; H04N 2201/04743; G08B 13/19613

USPC .......................................... 382/195, 194, 143
See application file for complete search history.

(56) References Cited

U.S. PATENT DOCUMENTS

| | | | |
|---|---|---|---|
| 8,411,109 B2 * | 4/2013 | Kramer | G06F 3/04845 345/619 |
| 8,761,517 B2 * | 6/2014 | Ding | G06K 9/00335 382/195 |
| 2015/0178565 A1 * | 6/2015 | Rivlin | G06T 7/004 382/103 |
| 2015/0248578 A1 * | 9/2015 | Utsumi | G06K 9/00201 382/154 |

* cited by examiner

*Primary Examiner* — Stephen R Koziol
*Assistant Examiner* — Shaghayegh Azima
(74) *Attorney, Agent, or Firm* — Patent Law Works LLP

(57) ABSTRACT

The disclosure includes a system and method for distinguishing between stock keeping units of similar appearance that vary in size. An image recognition application receives an image including a shelving unit stocking a plurality of items, identifies each item in the image, generates a region of interest for each identified item in the image, identifies a physical dimension of a portion of region depicted in the image, determines a dimension of the region of interest for each identified item and the portion of region in pixels, determines a pixel-to-physical dimension ratio using the dimension in pixels of the portion of region and the physical dimension of the portion of region depicted in the image, and determines a stock keeping unit identifier of each identified item in the image based on the pixel-to-physical dimension ratio and the dimension of the region of interest for each identified item.

20 Claims, 12 Drawing Sheets

700

701

| Product No. | Height (in mm) |
|---|---|
| 1 | 400/1.77 = 225.9 |
| 2 | 400/1.77 = 225.9 |
| 3 | 265/1.77 = 149.7 |
| 4 | 400/1.77 = 225.9 |
| 5 | 265/1.77 = 149.7 |
| 6 | 265/1.77 = 149.7 |
| 7 | 175/1.77 = 98.9 |
| 8 | 175/1.77 = 98.9 |
| 9 | 175/1.77 = 98.9 |
| 10 | 175/1.77 = 98.9 |
| 11 | 175/1.77 = 98.9 |

Figure 7

DISTINGUISHING BETWEEN STOCK KEEPING UNITS USING A PHYSICAL DIMENSION OF A REGION DEPICTED IN AN IMAGE

BACKGROUND

1. Field of the Invention

The specification generally relates to identifying and distinguishing between products in an image that vary in size but have a similar product packaging. In particular, the specification relates to a system and method for determining a size of each identified product in the image based on a physical dimension identified for a portion of region depicted in the image.

2. Description of the Background Art

A planogram is a visual representation of products in a retail environment. For example, a planogram may describe where in the retail environment and in what quantity products should be located. Such planograms are known to be effective tools for increasing sales, managing inventory and otherwise ensuring that the desired quantity and sizes of an item are placed to optimize profits or other parameters. However, presentation and maintenance of adequate levels of stock on shelves, racks and displays stands is a labor-intensive effort, thereby making enforcement of planograms difficult. While the location and quantity of products in retail stores can be manually tracked by a user, attempts are being made to automatically recognize the products.

Previous attempts at recognizing products have deficiencies. For example, existing image recognition techniques fail to distinguish between objects that are similar in appearance but vary in size.

SUMMARY

The techniques introduced herein overcome the deficiencies and limitations of the prior art, at least in part, with a system and method for distinguishing between stock keeping units of similar appearance that vary in size. In one embodiment, the system includes an image recognition application. The image recognition application is configured to receive an image of a plurality of items and to identify each item in the image. The image recognition application is further configured to generate a region of interest for each identified item in the image and to identify a physical dimension of a portion of a region depicted in the image. The image recognition application is further configured to determine a pixel dimension of the region of interest for each identified item and the portion of the region depicted in the image. Using the pixels dimension of the portion of the region and the physical dimension of the portion of the region depicted in the image, the image recognition application is further configured to determine a pixel-to-physical dimension ratio for the image. The image recognition application is further configured to determine a stock keeping unit identifier of each identified item in the image based on the pixel-to-physical dimension ratio and the pixel dimension of the region of interest for each identified item. The image of the plurality of items, for example, can include items of different sizes in similar packaging stocked on a shelf of a retail store.

Other aspects include corresponding methods, systems, apparatuses, and computer program products for these and other innovative aspects.

The features and advantages described herein are not all-inclusive and many additional features and advantages will be apparent to one of ordinary skill in the art in view of the figures and description. Moreover, it should be noted that the language used in the specification has been principally selected for readability and instructional purposes and not to limit the scope of the techniques described.

BRIEF DESCRIPTION OF THE DRAWINGS

The techniques introduced herein are illustrated by way of example, and not by way of limitation in the figures of the accompanying drawings in which like reference numerals are used to refer to similar elements.

FIG. 7 is a graphical representation of one embodiment of an example physical dimension table listing physical dimensions of identified products in the image.

DETAILED DESCRIPTION

Figure 1:
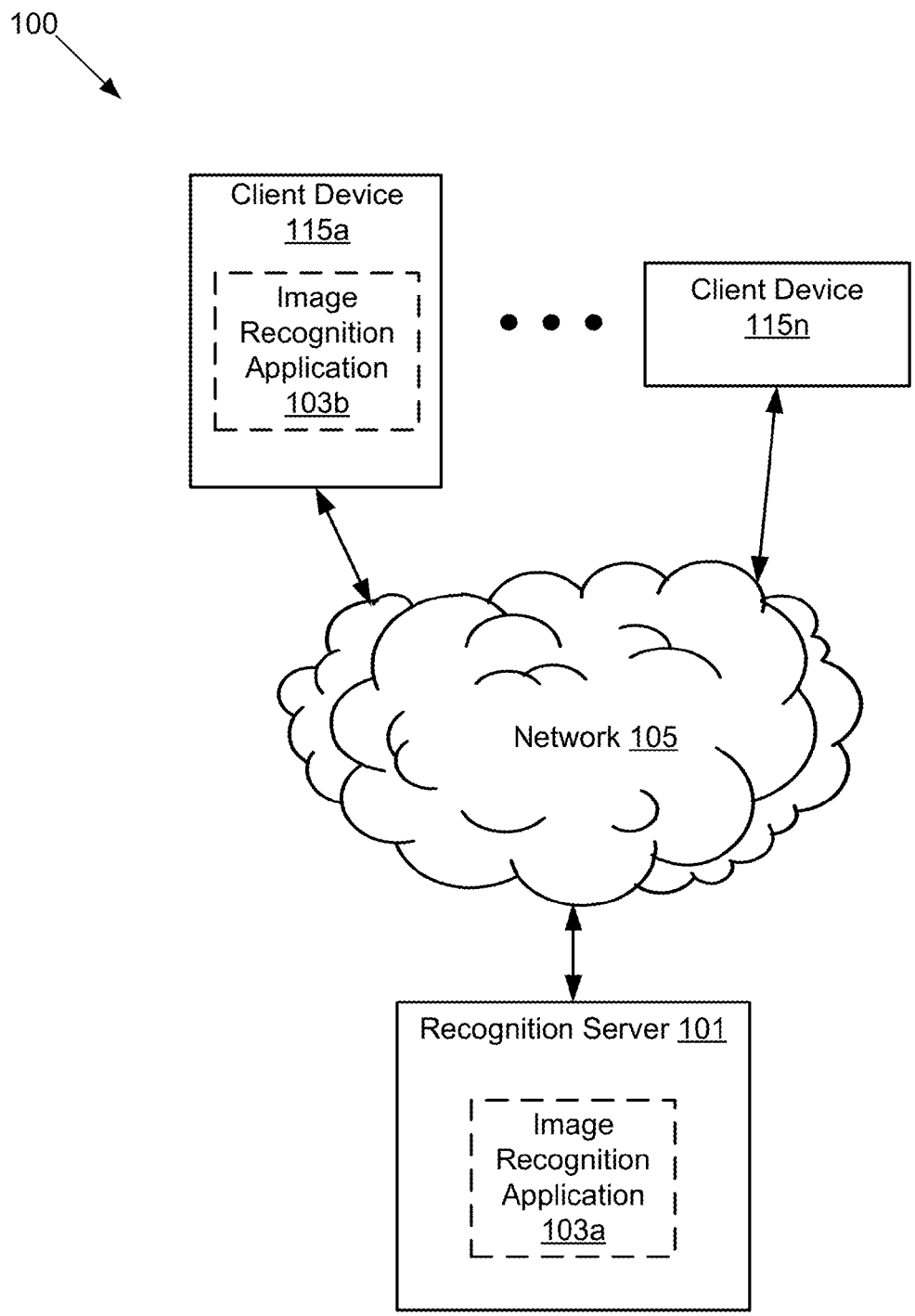
FIG. 1 is a high-level block diagram illustrating one embodiment of a system for distinguishing between stock keeping units of similar appearance that vary in size.

FIG. 1 is a high-level block diagram illustrating one embodiment of a system 100 for distinguishing between stock keeping units of similar appearance that vary in size. The illustrated system 100 may have client devices 115*a* . . . 115*n* that can be accessed by users and a recognition server 101. In FIG. 1 and the remaining figures, a letter after a reference number, e.g., "115*a*," represents a reference to the element having that particular reference number. A reference number in the text without a following letter, e.g., "115," represents a general reference to instances of the element bearing that reference number. In the illustrated embodiment, these entities of the system 100 are communicatively coupled via a network 105.

The network 105 can be a conventional type, wired or wireless, and may have numerous different configurations including a star configuration, token ring configuration or other configurations. Furthermore, the network 105 may include a local area network (LAN), a wide area network (WAN) (e.g., the Internet), and/or other interconnected data paths across which multiple devices may communicate. In some embodiments, the network 105 may be a peer-to-peer network. The network 105 may also be coupled to or include portions of a telecommunications network for sending data in a variety of different communication protocols. In some embodiments, the network 105 may include Bluetooth communication networks or a cellular communications network for sending and receiving data including via short messaging service (SMS), multimedia messaging service (MMS), hypertext transfer protocol (HTTP), direct data connection, WAP, email, etc. Although FIG. 1 illustrates one network 105 coupled to the client devices 115 and the recognition server 101, in practice one or more networks 105 can be connected to these entities.

In some embodiments, the system 100 includes a recognition server 101 coupled with the network 105. In some embodiments, the recognition server 101 may be either a hardware server, a software server, or a combination of software and hardware. The recognition server 101 may be, or may be implemented by, a computing device including a processor, a memory, applications, a database, and network communication capabilities. In the example of FIG. 1, the components of the recognition server 101 are configured to implement an image recognition application 103a described in more detail below. In one embodiment, the recognition server 101 provides services to consumer packaged goods firm for identifying products on shelves, racks, or displays. While the examples herein describe recognition of products in an image of shelves, such as a retail display, it should be understood that the image may include any arrangement of organized objects. For example, the image may be of a warehouse, stockroom, store room, cabinet, etc. Similarly, the objects, in addition to retail products, may be tools, parts used in manufacturing, construction or maintenance, medicines, first aid supplies, emergency or safety equipment, etc.

In some embodiments, the recognition server 101 sends and receives data to and from other entities of the system 100 via the network 105. For example, the recognition server 101 sends and receives data including images of products to and from the client device 115. The images of products received by the recognition server 101 can include an image captured by the client device 115, an image copied from a website or an email, or an image from any other source. Although only a single recognition server 101 is shown in FIG. 1, it should be understood that there may be any number of recognition servers 101 or a server cluster. The recognition server 101 also includes a data storage 243, which is described below in more detail with reference to FIG. 2.

The client device 115 may be a computing device that includes a memory, a processor and a camera, for example a laptop computer, a desktop computer, a tablet computer, a mobile telephone, a smartphone, a personal digital assistant (PDA), a mobile email device, a webcam, a user wearable computing device or any other electronic device capable of accessing a network 105. The client device 115 provides general graphics and multimedia processing for any type of application. The client device 115 includes a display for viewing information provided by the recognition server 101. In some embodiments, the client device 115 may include built-in sensors that measure motion, orientation, temperature, humidity, distance, etc. The client device 115 may also interface with an external sensor such as, an ultrasound sensor, etc. While FIG. 1 illustrates two client devices 115a and 115n, the disclosure applies to a system architecture having one or more client devices 115.

In some embodiments, the client device 115 determines location information using global positioning system (GPS) circuitry included within the device itself to determine its location. In some embodiments, the client device 115 accesses a database including pairs of media access control (MAC) addresses and locations over the internet. The client device 115 retrieves the location corresponding to the access point MAC address from the database to determine the location of the client device 115. For determining the client device's 115 location indoors, the client device 115 employs radio frequency, ultra-sound signal or invisible light communication, Bluetooth, and magnetic field variations. For example, the client device 115 determines its location on a floor in a building through wireless access points based on measuring the intensity of received signals. In some embodiments, the integration of a GPS-enabled client device 115 with location sensing through wireless access points is determined to resolve location sensing to a few feet, etc. In another embodiment, similar position transmitting devices will resolve location sensing to closer than a few feet. In some embodiments, the client device 115 detects distance of an object in front of an ultrasound sensor coupled to the client device 115. For example, the ultrasound sensor can be connected to a power port of the smartphone. In another example, the ultrasound sensor can be coupled wirelessly through Bluetooth™ to the smartphone. The client device 115 detects the distance of the object in front by triggering the ultrasound sensor to send out a burst of ultrasound pulse and listen for the echo when it bounces off the object. The client device 115 determines the distance based on the time it took for the echo to return to the ultrasound sensor.

The client device 115 is adapted to send and receive data to and from the recognition server 101. For example, the client device 115 sends a query image to the recognition server 101 and the recognition server 101 provides data in JSON (JavaScript Object Notation) format about one or more objects recognized in the query image to the client device 115.

The image recognition application 103 may include software and/or logic- to provide the functionality for receiving query images and identifying multiple stock keeping units (SKUs) varying in size in the query images. In some embodiments, the image recognition application 103 can be implemented using programmable or specialized hardware, such as a field-programmable gate array (FPGA) or an application-specific integrated circuit (ASIC). In some embodiments, the image recognition application 103 can be implemented using a combination of hardware and software. In other embodiments, the image recognition application 103 may be stored and executed on a combination of the client devices 115 and the recognition server 101, or by any one of the client devices 115 or recognition server 101.

In some embodiments, the image recognition application 103b acts as a thin-client application with some functionality executed on the client device 115 and additional functionality executed on the recognition server 101 by recognition application 103a. For example, the image recognition application 103b on the client device 115 could include software and/or logic for capturing the image, transmitting the image to the recognition server 101, and displaying image recognition results. A thin-client application 103b may include additional functionality described herein with reference to recognition application 103, such as processing the image and performing feature identification.

In some embodiments, the image recognition application 103 receives an image depicting a plurality of items. For example, the image may be of a shelving unit holding breakfast cereal boxes in a retail supermarket. The image recognition application 103 identifies each product in the image and generates a region of interest for each identified product. The image recognition application 103 determines a pixel dimension of the region of interest for each identified product in the image. For example, in various embodiments, the pixel dimension of the region of interest me be a height, a width, an area, a diagonal length, etc. in pixels. The image recognition application 103 identifies a physical dimension of a portion of region depicted in the image. The image recognition application 103 determines a pixel dimension of the portion of region depicted in the image. The image recognition application 103 determines a pixel-to-physical dimension ratio using the pixel dimension of the portion of the region and the physical dimension of the portion of the region depicted in the image. The image recognition application 103 determines a size of each identified item in the image based on the pixel-to-physical dimension ratio and the dimension of the region of interest for each identified product. The operation of the image recognition application 103 and the functions listed above are described below in more detail below with reference to FIGS. 3-10.

Figure 2:
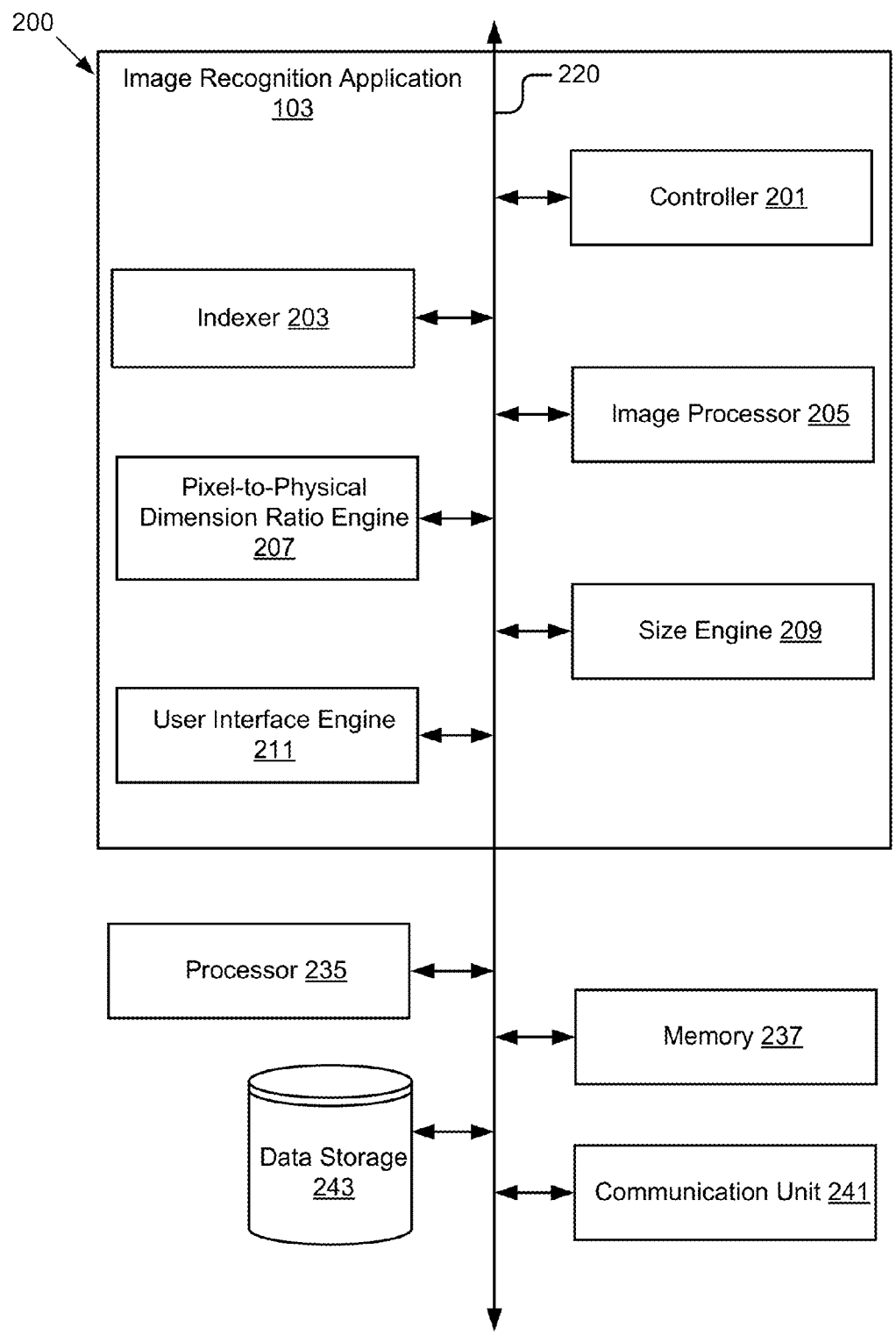
FIG. 2 is a block diagram illustrating one embodiment of a computing device including an image recognition application.

FIG. 2 is a block diagram illustrating an embodiment of a computing device 200 including an image recognition application 103. The computing device 200 may also include a processor 235, a memory 237, a communication unit 241, and data storage 243 according to some examples. The components of the computing device 200 are communicatively coupled by a bus 220. The bus 220 may represent one or more buses including an industry standard architecture (ISA) bus, a peripheral component interconnect (PCI) bus, a universal serial bus (USB), or some other bus known in the art to provide similar functionality. In some embodiments, the computing device 200 may be a client device 115, a recognition server 101, or a combination of a client device 115 and a recognition server 101.

The processor 235 may execute software instructions by performing various input/output, logical, and/or mathematical operations. The processor 235 may have various computing architectures to process data signals including, for example, a complex instruction set computer (CISC) architecture, a reduced instruction set computer (RISC) architecture, and/or an architecture implementing a combination of instruction sets. The processor 235 may be physical and/or virtual, and may include a single processing unit or a plurality of processing units and/or cores. In some implementations, the processor 235 may be capable of generating and providing electronic display signals to a display device, supporting the display of images, capturing and transmitting images, performing complex tasks including various types of feature extraction and sampling, etc. In some implementations, the processor 235 may be coupled to the memory 237 via the bus 220 to access data and instructions therefrom and store data therein. The bus 220 may couple the processor 235 to the other components of the computing device 200 including, for example, the memory 237, the communication unit 241, the image recognition application 103, and the data storage 243. It will be apparent to one skilled in the art that other processors, operating systems, sensors, displays and physical configurations are possible.

The memory 237 may store and provide access to data for the other components of the computing device 200. The memory 237 may be included in a single computing device or a plurality of computing devices as discussed elsewhere herein. In some implementations, the memory 237 may store instructions and/or data that may be executed by the processor 235. The instructions and/or data may include code for performing the techniques described herein. For example, in one embodiment, the memory 237 may store the image recognition application 103. The memory 237 is also capable of storing other instructions and data, including, for example, an operating system, hardware drivers, other software applications, databases, etc. The memory 237 may be coupled to the bus 220 for communication with the processor 235 and the other components of the computing device 200.

The memory 237 may include one or more non-transitory computer-usable (e.g., readable, writeable) device, a static random access memory (SRAM) device, an embedded memory device, a discrete memory device (e.g., a PROM, FPROM, ROM), a hard disk drive, an optical disk drive (CD, DVD, Blu-ray™, etc.) mediums, which can be any tangible apparatus or device that can contain, store, communicate, or transport instructions, data, computer programs, software, code, routines, etc., for processing by or in connection with the processor 235. In some implementations, the memory 237 may include one or more of volatile memory and non-volatile memory. For example, the memory 237 may include, but is not limited, to one or more of a dynamic random access memory (DRAM) device, a static random access memory (SRAM) device, an embedded memory device, a discrete memory device (e.g., a PROM, FPROM, ROM), a hard disk drive, an optical disk drive (CD, DVD, Blu-ray™, etc.). It should be understood that the memory 237 may be a single device or may include multiple types of devices and configurations.

The communication unit 241 is hardware for receiving and transmitting data by linking the processor 235 to the network 105 and other processing systems. The communication unit 241 receives data such as requests from the client device 115 and transmits the requests to the controller 201, for example a request to process an image including a plurality of products. The communication unit 241 also transmits information including recognition results to the client device 115 for display, for example, in response to a query image. The communication unit 241 is coupled to the bus 220. In one embodiment, the communication unit 241 may include a port for direct physical connection to the client device 115 or to another communication channel. For example, the communication unit 241 may include an RJ45 port or similar port for wired communication with the client device 115. In another embodiment, the communication unit 241 may include a wireless transceiver (not shown) for exchanging data with the client device 115 or any other communication channel using one or more wireless communication methods, such as IEEE 802.11, IEEE 802.16, Bluetooth® or another suitable wireless communication method.

In yet another embodiment, the communication unit 241 may include a cellular communications transceiver for sending and receiving data over a cellular communications network such as via short messaging service (SMS), multimedia messaging service (MMS), hypertext transfer protocol (HTTP), direct data connection, WAP, e-mail or another suitable type of electronic communication. In still another embodiment, the communication unit 241 may include a wired port and a wireless transceiver. The communication unit 241 also provides other conventional connections to the network 105 for distribution of files and/or media objects using standard network protocols such as TCP/IP, HTTP, HTTPS and SMTP as will be understood to those skilled in the art.

The data storage 243 is a non-transitory memory that stores data for providing the functionality described herein. The data storage 243 may be a dynamic random access memory (DRAM) device, a static random access memory (SRAM) device, flash memory or some other memory devices. In some embodiments, the data storage 243 also may include a non-volatile memory or similar permanent storage device and media including a hard disk drive, a floppy disk drive, a CD-ROM device, a DVD-ROM device, a DVD-RAM device, a DVD-RW device, a flash memory device, or some other mass storage device for storing information on a more permanent basis.

In the illustrated embodiment, the data storage 243 is communicatively coupled to the bus 220. The data storage 243 stores data for analyzing a received image and results of the analysis and other functionality as described herein. For example, the data storage 243 may store the stock keeping unit (SKU) table that maps a plurality of product attributes to each product identifier. The data storage 243 may similarly store a product feature table that associates features of a product to a product identifier to support feature based query results retrieval. In some embodiments, the data storage 243 stores a floor map of a retail store identifying a location of each aisle and corresponding physical dimensions of a shelving unit in the aisle. In some embodiments, data storage 243 may store captured regions and/or associated dimension information, each region captured by a user either using an interactive rectangle of the user device or other means of calculation as described in more detail below. Additionally, the data storage 243 may store identified products in the received image, the corresponding regions of interest and the pixel dimensions of the regions of interest. The data storage 243 may also store the pixel-to-physical dimension ratio as described herein. The data stored in the data storage 243 is described below in more detail.

In some embodiments, the image recognition application 103 may include a controller 201, an indexer 203, an image processor 205, a pixel-to-physical dimension ratio engine 207, a size engine 209 and a user interface engine 211. The components of the image recognition application 103 are communicatively coupled via the bus 220.

The controller 201 may include software and/or logic to control the operation of the other components of the image recognition application 103. The controller 201 controls the other components of the image recognition application 103 to perform the methods described below with reference to FIGS. 9-10. The controller 201 may also include software and/or logic to provide the functionality for handling communications between the image recognition application 103 and other components of the computing device 200 as well as between the components of the image recognition application 103. In some embodiments, the controller 201 can be implemented using programmable or specialized hardware including a field-programmable gate array (FPGA) or an application-specific integrated circuit (ASIC). In some embodiments, the controller 201 can be implemented using a combination of hardware and software executable by processor 235. In some embodiments, the controller 201 is a set of instructions executable by the processor 235. In some implementations, the controller 201 is stored in the memory 237 and is accessible and executable by the processor 235. In some implementations, the controller 201 is adapted for cooperation and communication with the processor 235, the memory 237 and other components of the image recognition application 103 via the bus 220.

In some embodiments, the controller 201 sends and receives data, via the communication unit 241, to and from one or more of a client device 115 and a recognition server 101. For example, the controller 201 receives, via the communication unit 241, an image from a client device 115 operated by a user and sends the image to the image processor 205. In another example, the controller 201 receives data for providing a graphical user interface to a user from the user interface engine 211 and sends the data to a client device 115, causing the client device 115 to present the user interface to the user.

In some embodiments, the controller 201 receives data from other components of the image recognition application 103 and stores the data in the data storage 243. For example, the controller 201 receives data including a pixel-to-physical dimension ratio from the pixel-to-physical dimension ratio engine 207 and stores the data in the data storage 243. In other embodiments, the controller 201 retrieves data from the data storage 243 and sends the data to other components of the image recognition application 103. For example, the controller 201 retrieves data including the stock keeping unit (SKU) table data from the data storage 243 and sends the retrieved data to the size engine 209.

The indexer 203 may include software and/or logic to provide the functionality for storing images of products in a database table for image recognition. In some embodiments, the indexer 203 can be implemented using programmable or specialized hardware including a field-programmable gate array (FPGA) or an application-specific integrated circuit (ASIC). In some embodiments, the indexer 203 can be implemented using a combination of hardware and software executable by processor 235. In some embodiments, the indexer 203 is a set of instructions executable by the processor 235. In some implementations, the indexer 203 is stored in the memory 237 and is accessible and executable by the processor 235. In some implementations, the indexer 203 is adapted for cooperation and communication with the processor 235, the memory 237 and other components of the image recognition application 103 via the bus 220.

In some embodiments, the indexer 203 may receive an image of a packaged product as a base image. For example, an image of a packaged product may include a cylindrical soda bottle, a rectangular breakfast cereal box, a rectangular tea box, a circular tray of sandwich cookies, etc. In some embodiments, the packaged product may have a plurality of base images associated with it. For example, the indexer 203 may receive images of the top, bottom, front, back, and sides of the packaged product as base images of the packaged product for storing in the data storage 243. The indexer 203 extracts a set of features and stores the set of features identified for the base image for image recognition in the data storage 243. The set of features stored for image recognition can be robust to variations in scale, rotation, ambient lighting, image acquisition parameters, etc. In some embodiments, the indexer 203 maps the base image to a set of values such as, product name, product identifier, company planogram, delivery schedule, employee who stocks the product on store shelves, number of units on stock, etc. The mapping may be stored on the data storage 243 in an acceptable file format, for example an Extensible Markup Language (XML) file format. In some embodiments, the indexer 203 includes the set of features identified for each product and a relative location to a point in the base image (e.g., the location of one identified feature) where each feature occurs. In some embodiments, the indexer 203 organizes the indices to store the mappings in the data storage 243 to support a feature-based query search and result retrieval. The results of the feature-based query may be presented in a suitable file format, for example in a JavaScript Object Notation (JSON) file format.

In some embodiments, the indexer 203 receives a product description including physical dimensions for a stock keeping unit from a consumer packaged goods (CPG) company. A stock keeping unit (SKU) is a distinct item, such as a product offered for sale. The stock keeping unit can be identified by attributes that makes the item distinguishable from other items. For example, the attributes include manufacturer, size, color, packaging, a product description, material, etc. The stock keeping unit may also refer to a unique identifier that refers to the particular product or service in inventory. In some embodiments, the stock keeping units may vary in size while having a packaged cover that is visually similar in appearance. For example, breakfast cereal boxes of a particular brand "ABC" can be sold in more than one package size in supermarkets to suit different consumer needs. However, while being visually similar in appearance, each package size is a distinct stock keeping unit. The product description may be in a computer readable form, for example in a JSON (JavaScript Object Notation) format for indexing.

Figure 5:
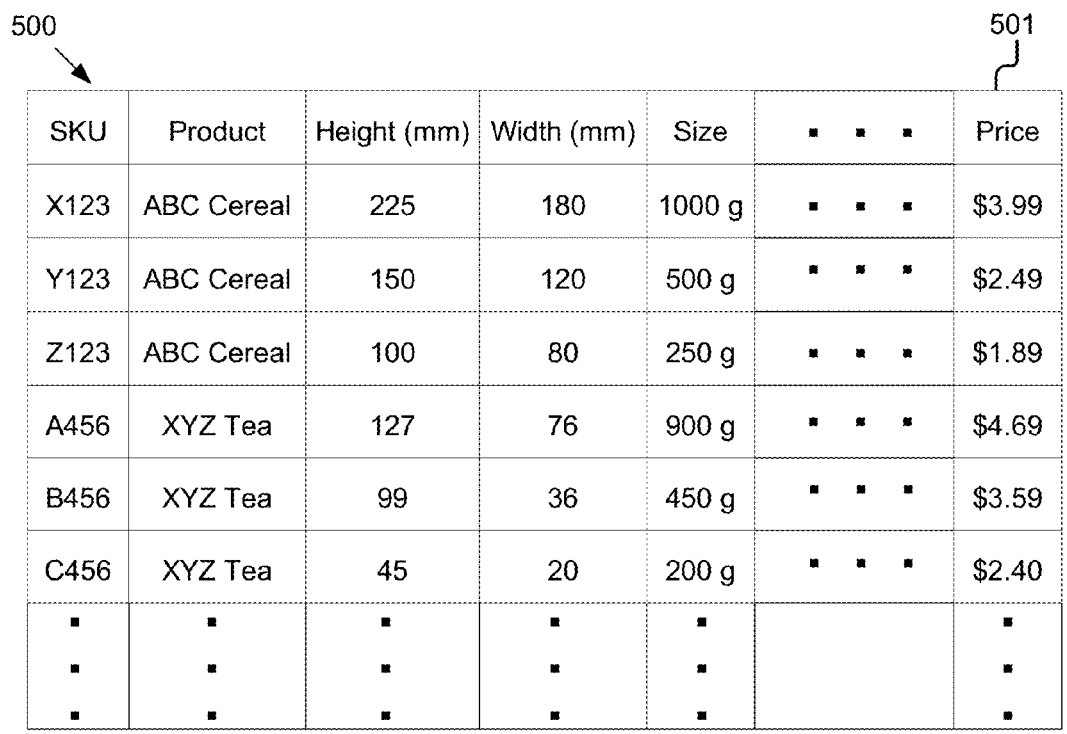
FIG. 5 is a graphical representation of an example stock keeping unit (SKU) table for mapping a plurality of product attributes to each product identifier.

Using the product descriptions, or other information input by a user, the indexer 203 generates a stock keeping unit (SKU) table for a plurality of the stock keeping units having a package cover that is visually similar in appearance but varying in size. The SKU table maps an identity of a particular product to a plurality of product attributes. Product attributes may include, for example, product name, stock keeping unit identifier, width, height, depth, area, diagonal length, product size, manufacturer brand, model number, price, product/item image, or the like. The indexer 203 stores the SKU table in the data storage 243. For example, as shown in the example of FIG. 5, a SKU table may include entries for "ABC" breakfast cereal boxes such as, a first entry for a one kilogram size of "ABC" breakfast cereal box correspondingly mapped to a height of 225 mm, a width of 180 mm, a SKU identifier "X123," etc., a second entry for a 500 gram size of "ABC" breakfast cereal box correspondingly mapped to a height of 150 mm, a width of 120 mm, a SKU identifier "Y123," etc., and a third entry for a 250 gram size of "ABC" breakfast cereal box correspondingly mapped to a height of 100 mm, a width of 80 mm, a SKU identifier "Z123," etc. The SKU table shown in FIG. 5 may include separate entries for other products such as, tea packets, cookies, sodas, etc. For example, the SKU table may include entries for "XYZ" tea packets such as, a fourth entry for a 900 gram size of "XYZ" tea packet correspondingly mapped to a height of 127 mm, a width of 76 mm, a SKU identifier "A456," etc. In other embodiments, the indexer 203 stores the dimensions of the products in the SKU table using other systems of measurements such as, inches, feet, centimeters, meters, etc., and the size of the products in other systems for measurements such as, liters, gallons, ounces, pounds, kilograms, fluid ounces, etc.

In some embodiments, the indexer 203 may receive an annotation from a user (e.g., sales executive, auditor, etc.) on an indoor floor map of the retail store identifying a location of an aisle and corresponding physical dimensions of a shelving unit in the aisle. The floor map can be displayed on the client device 115 for receiving the annotation from the user. In some embodiments, the indexer 203 maps the shelving unit at the aisle location to the corresponding physical dimensions of the shelving unit. For example, the indexer 203 receives a selection of an aisle '2' in a floor map of the retail supermarket. The aisle '2' can be stocking bathroom supplies. The indexer 203 receives a height of the shelving unit in aisle '2' as three feet and maps it to the shelving unit located in aisle '2'. In another example, the indexer 203 receives a selection of an aisle '3' in the floor map of the retail supermarket. The aisle '3' can be stocking soda bottles. The indexer 203 receives a first height for the top shelf in the shelving unit of aisle '3' as three feet and a second height for the bottom shelf in the shelving unit of aisle '3' as two feet. The indexer 203 maps both heights to the shelving unit located in aisle '3'. In some embodiments, the indexer 203 stores the data including the floor map in the data storage 243.

The image processor 205 may include software and/or logic to provide the functionality for receiving and processing images of stock keeping units on a shelf in retail stores. In some embodiments, the image processor 205 can be implemented using hardware including a field-programmable gate array (FPGA) or an application-specific integrated circuit (ASIC). In some embodiments, the image processor 205 can be implemented using a combination of hardware and software executable by processor 235. In some embodiments, the image processor 205 is a set of instructions executable by the processor 235. In some implementations, the image processor 205 is stored in the memory 237 and is accessible and executable by the processor 235. In some implementations, the image processor 205 is adapted for cooperation and communication with the processor 235, the memory 237 and other components of the image recognition application 103 via the bus 220.

In some embodiments, the image processor 205 receives an image as a query from a user. The image processor 205 may process individual images serially or in parallel. In some embodiments, the image processor 205 may stitch multiple images received from the user into a single query image for processing. The query image may be received for recognition and may include multiple items of interest on a shelving unit in a retail store. For example, the query image can be an image of packaged products such as, rectangular breakfast cereal boxes, circular soda bottles, etc. captured by the client device 115 at a distance from the shelving unit. The packaged product may include textual and pictorial information printed on its surface that distinguishes it from other items on the shelf. The packaged product may also sit in an arbitrary orientation on the shelf at any given time. For example, a box-like packaged product such as, a breakfast cereal box might be positioned with the front, the back, the top, the bottom, or the sides of the breakfast cereal box exposed to the user looking at the shelf. In another example, a cylindrically packaged product such as, a chocolate chip cookies package might be positioned rotated on its horizontal axis with the textual and pictorial information printed on its surface partially exposed to the user looking at the shelf. In some embodiments, the image processor 205 determines whether the received image is optimal for recognition and instructs the user interface engine 211 to generate graphical data for instructing the user to retake the image of the shelf if a section of the image taken has limited information for complete recognition (e.g., packaged products on top shelf is cut off), the image is too blurry, the image has an illumination artifact (e.g., excessive reflection), etc.

Figure 4:
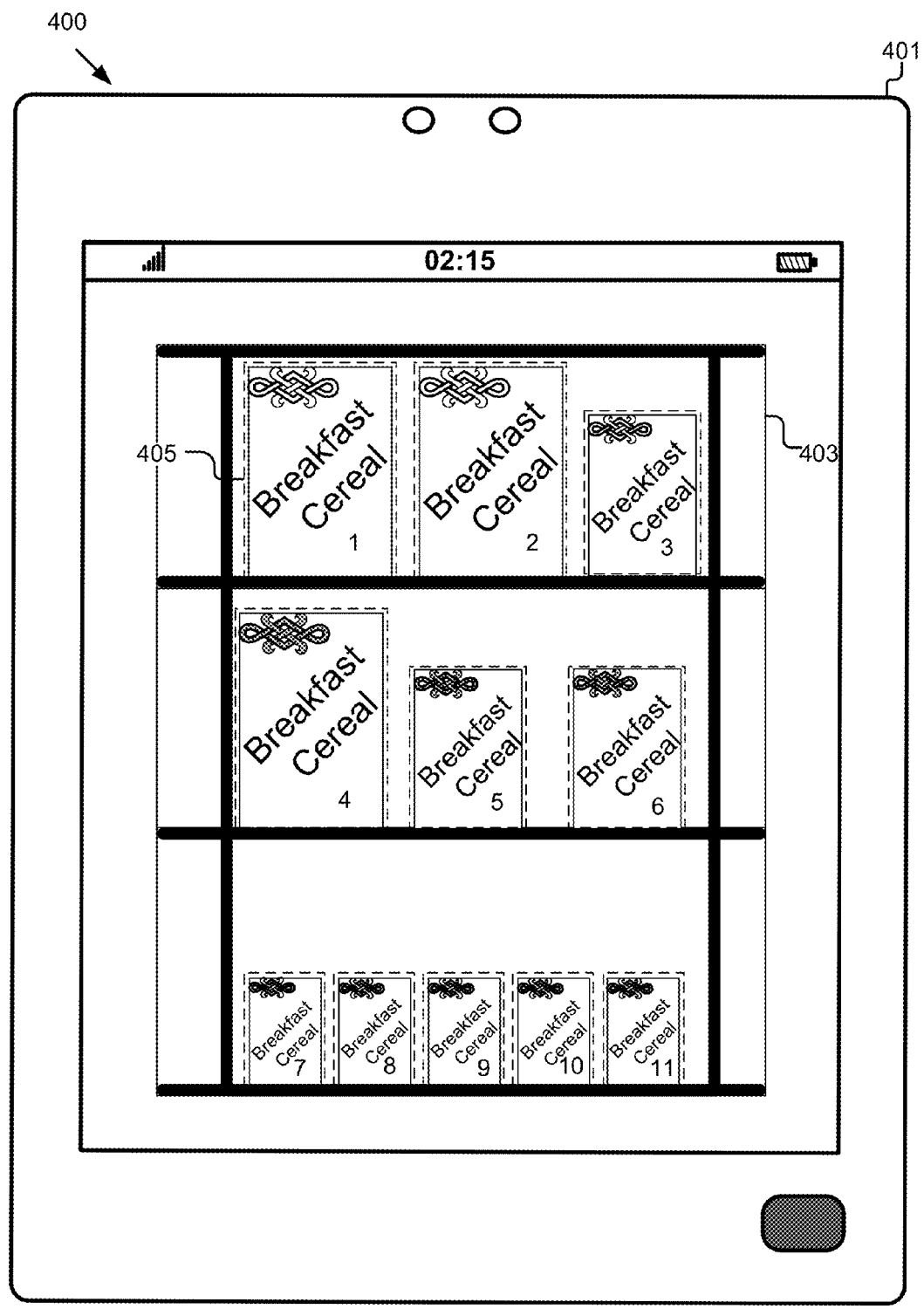
FIG. 4 is a graphical representation of one embodiment of processing an image of a plurality of products in a shelving unit for image recognition.

In some embodiments, the image processor 205 extracts features from the received image of products on the shelving unit and matches the extracted features to those features stored in the database for recognition. The image processor 205 identifies the products in the received image matching the stored features. The image processor 205 returns the matched items and an associated region of interest (ROI) bordering each of the matched items in the received image. A region of interest can be of any shape, for example, a circle with a center point and a diameter, a rectangular shape of a width, a height and one or more reference points for the region (e.g., a center point, one or more corner points for the region), etc. In some embodiments, the image processor 205 identifies each region of interest associated with the items of interest in the image in a numbered sequence. For example, as shown in the example of FIG. 4 which is described in more detail below, the image processor 205 identifies 11 "ABC" breakfast cereal boxes in a received image of the shelving unit and returns 11 rectangular polygon ROIs, one for each of the "ABC" breakfast cereal boxes. The 11 "ABC" breakfast cereal boxes in the image may have the same product packaging while varying in content size. The 11 "ABC" rectangular polygon ROIs may be numbered in a sequence. In another example, the image processor 205 identifies five soda bottles in a received image. The five soda bottles may vary in volume size. The image processor 205 returns five polygon ROIs bordering the exposed labeling containing pictorial and textual information on each one of the soda bottles. In some embodiments, the image processor 205 stores all the identified items in the received image and their corresponding regions of interest in the data storage 243. To distinguish between products in the image that vary only in size, the image processor 205 determines pixel dimensions of each identified item in the received image. In some embodiments, the image processor 205 determines the pixel dimensions of the region of interest associated with the identified product in the received image. For example, as shown in the example of FIG. 5, the image processor 205 determines the height, in pixels, of stock keeping units such as, breakfast cereal boxes in different sizes identified in the received image of FIG. 4. In other examples, the image processor 205 may determine a width in pixels, an area in pixels, a diagonal length in pixels, etc. of the region of interest. In some embodiments, the image processor 205 sends the pixel dimensions of the regions of interest of each identified product in the received image to the size engine 209.

Figure 3:
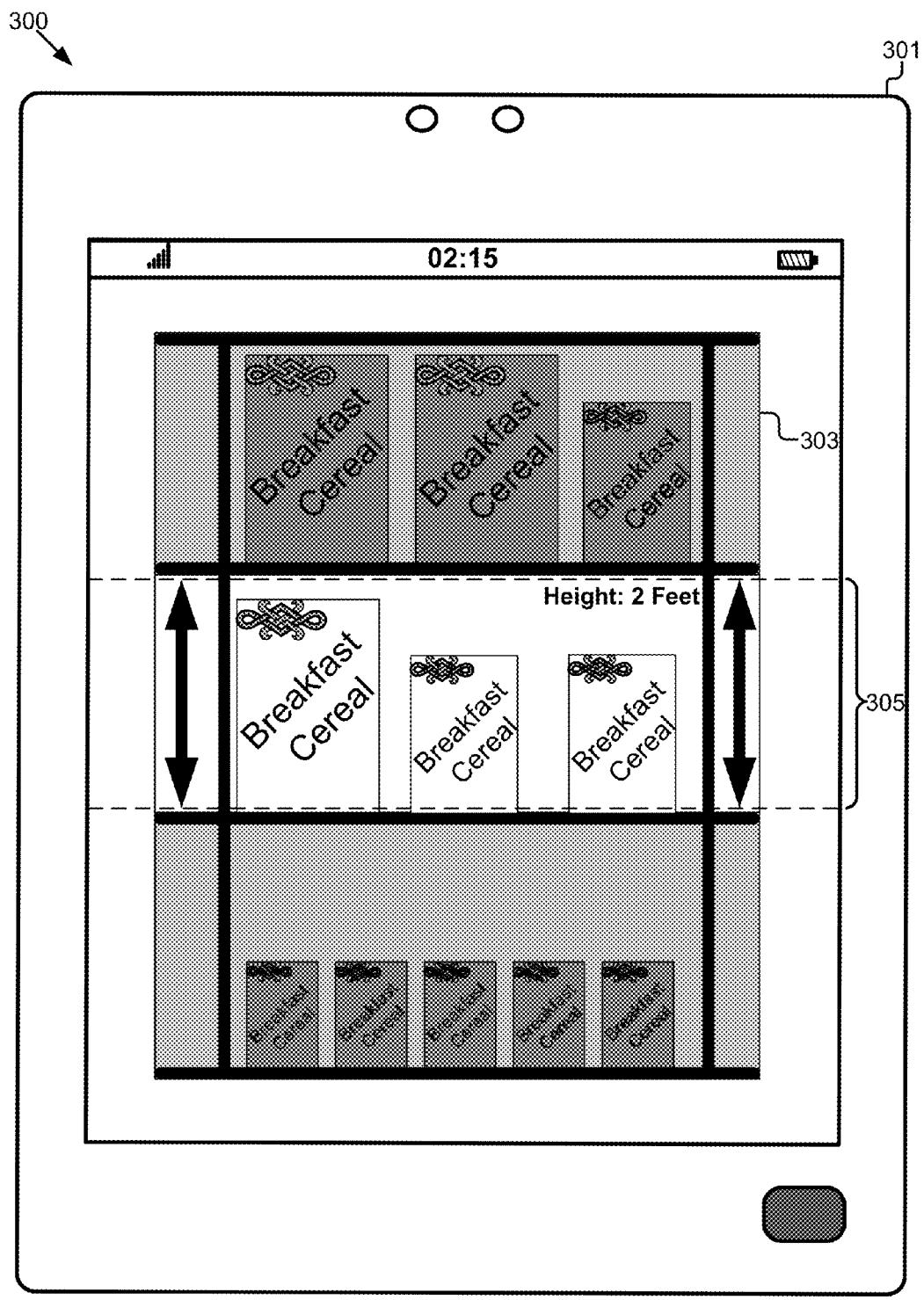
FIG. 3 is a graphical representation of one embodiment of capturing an image of a plurality of products in a shelving unit for retail auditing.

In some embodiments, the image processor 205 instructs the user interface engine 211 to generate graphical user interface that depicts an interactive graphical geometric shape superimposed on the received image. For example, the image processor 205 instructs the user interface engine 211 to generate an interactive rectangle to be superimposed on a region depicted in the image on the display of the client device 115. Other examples of interactive graphical geometric shape may include a polygon, a circle, an ellipse, etc. The interactive graphical geometric shape superimposed on the received image may be flexible (in terms of sizing and placement) and the image processor 205 receives input from the user to align the interactive graphical geometric shape to superimpose on a desired region depicted in the received image for which the physical dimensions may be known. For example, the image processor 205 receives user input to increase and/or decrease the length and/or breadth of the interactive rectangle to align and superimpose on a product packaging such as, a tea pack depicted in the received image. In another example, the image processor 205 receives user input to align and superimpose the interactive rectangle on a shelf depicted in the received image. In yet another example, the image processor 205 receives user input to align the interactive rectangle to superimpose the shelving unit depicted in the image. In some embodiments, the image processor 205 receives a physical dimension of the desired region depicted in the received image and superimposed by the interactive graphical geometric shape as an input from the user. The physical heights of the tea pack, the shelf, and the shelving unit in the above examples may be known to the user and received as input. For example, the image processor 205 receives a height of six feet for the shelving unit superimposed by the interactive rectangle as user input. In another example, the image processor 205 receives a height of two feet for a shelf in the shelving unit that is superimposed by the interactive rectangle as user input (e.g., as depicted in the example of FIG. 3 with reference to interactive rectangle 305). In some embodiments, the image processor 205 determines pixel dimension of the interactive graphical geometric shape superimposed on a region as depicted in the image. For example, the image processor 205 determines the height (in pixels) of the interactive rectangle superimposed on the shelf in the shelving unit. In some embodiments, the image processor 205 sends data including the pixel dimension of the interactive graphical geometric shape superimposed on a region depicted in the received image to the pixel-to-physical dimension ratio engine 207 for determining a pixel-to-physical dimension ratio which is explained in more detail below.

In some embodiments, the image processor 205 retrieves the physical dimension of the desired region depicted in the received image and superimposed by the interactive graphical geometric shape based on a detected location of the client device 115 when the image of the shelving unit is received. In some embodiments, the image processor 205 retrieves a floor map of the retail store and detects a current location of the client device 115 on the floor map when the image processor 205 receives the image of the shelving unit. The image processor 205 identifies the aisle in the retail store corresponding to the current location of the client device 115 on the floor map and retrieves physical dimensions of the shelving unit mapped to the aisle on the floor map. For example, the image processor 205 identifies the location of the client device 115 to be on aisle '2' and determines the height of the interactive rectangle superimposing a shelf in the received image to be three feet. In some embodiments, the image processor 205 sends the physical dimensions of the desired region as depicted and superimposed by the interactive graphical geometric shape in the received image to the pixel-to-physical dimension ratio engine 207 for determining the pixel-to-physical dimension ratio.

Figure 8:
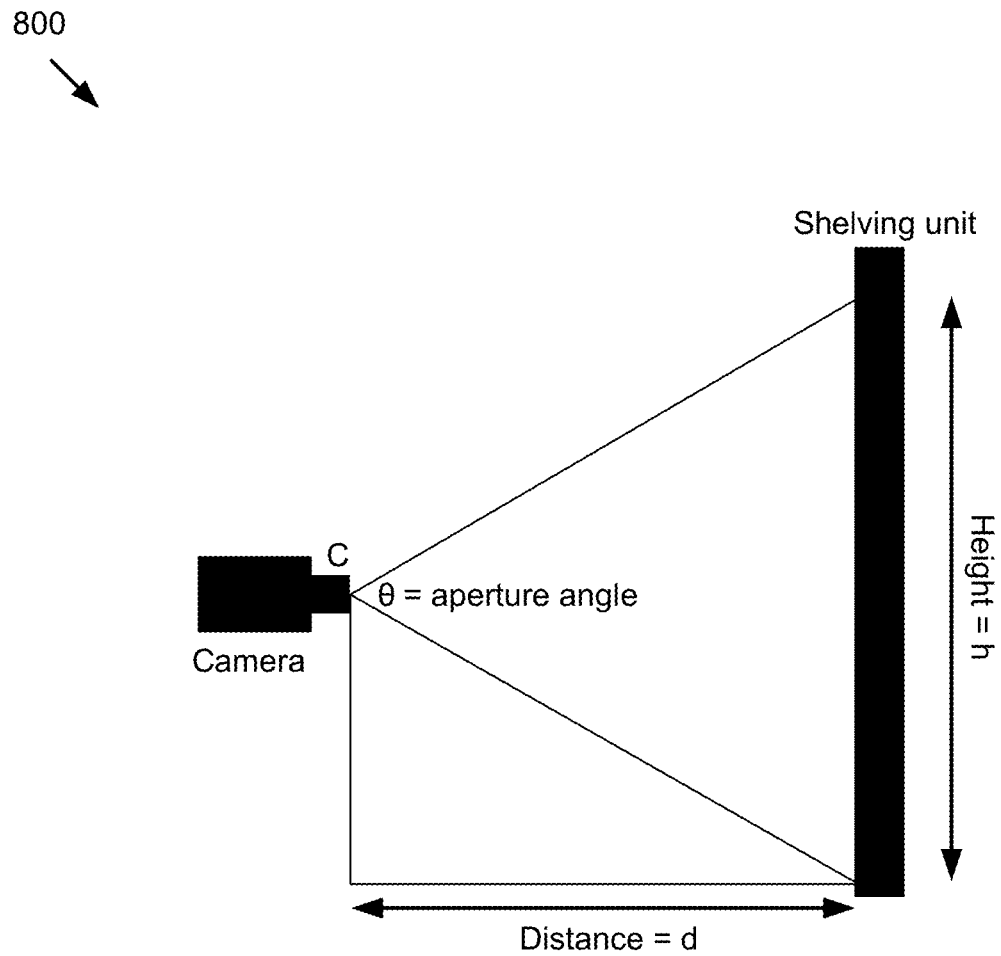
FIG. 8 is a graphical representation of one embodiment of determining a height of the shelving unit depicted in an image of the shelving unit.

In some embodiments, the image processor 205 determines the physical dimensions of the captured region as depicted in the received image. The image processor 205 identifies an aperture angle for the client device 115 that captures the image of products on the shelving unit (e.g., as depicted in the example of FIG. 8). The aperture angle of the client device 115 is the apparent angle of the lens aperture as seen from the focal point. For example, the image processor 205 identifies the aperture angle from camera specifications stored in the data storage 243. In some embodiments, the image processor 205 identifies a distance of the client device 115 that captures the image from the shelving unit where the products are stocked. The image processor 205 determines the physical dimensions of the captured region depicted in the received image of products on the shelving unit based on the distance of the client device 115 from the shelving unit and the aperture angle of the client device 115. The formula to determine the physical height of captured region can be formally stated as:

$$h = 2*d*\tan\left(\frac{\theta}{2}\right)$$

where 'h' is the height of the region covered by the client device 115 in the image, 'd' is the distance of the client device 115 from the shelving unit and 'θ' is the aperture angle of the client device 115 that captured the image. In some embodiments, the value of height determined based on the above formula can be accurate only if the focal plane of the client device 115 is parallel to the object of interest (i.e. shelving unit). In some embodiments, the image processor 205 sends the height in pixels and the estimated physical height for the captured region depicted in the received image to the pixel-to-physical dimension ratio engine 207 for determining the pixel-to-physical dimension ratio.

In some embodiments, the image processor 205 identifies the distance 'd' of the client device 115 from the shelving unit for determining the height 'h' of the region depicted in the image captured by the client device 115. This may be a preprocessing step before an image of the shelving unit stocking products is received by the image processor 205 for image recognition as described previously. In some embodiments, the image processor 205 instructs the user interface engine 211 to generate graphical data for instructing the user to capture an image of the base of the shelving unit to determine the distance of the client device 115 from the shelving unit. The base of the shelving unit and the feet of the user who is capturing the image may be level with each other. The image processor 205 receives the image of the base of the shelving unit and determines an angle of tilt of the client device 115 in order to position the base of the shelving unit at the center and middle of the image. The image processor 205 approximates a height of the client device 115 off the ground as a height of the user using the client device 115 and the image processor 205 receives the height of the user as a user input. In some embodiments, the image processor 205 instructs the indexer 203 to store the height of the user who is auditing the retail store in the data storage 243. The image processor 205 determines the distance of the shelving unit from the client device 115 by multiplying the height of the client device 115 off the ground with a tangent of the angle of tilt of the client device 115.

In some embodiments, the image processor 205 determines an item of interest on the shelving unit that is in focus in the image captured by the client device 115. The image processor 205 determines a distance of the client device 115 from the shelving unit based on the distance of the item of interest that is in focus in the image from the client device 115. For example, the image processor 205 determines the distance of a breakfast cereal box on the shelf from the client device 115. The image processor 205 may communicate with the built-in functions of the client device 115 and can access raw distance data measured by the client device 115 while focusing on an item of interest. For example, the image processor 205 can make an application programming interface (API) call to retrieve the estimated distance between the camera in a smartphone and the item of interest in focus. In some embodiments, the image processor 205 determines a distance of the item of interest on the shelving unit from the client device 115 by triggering a burst of ultrasound pulse from an ultrasound sensor and listening for the echo when it bounces off the item of interest. For example, the image processor 205 triggers the ultrasound pulse from the ultrasound sensor coupled to the smartphone via Bluetooth™ and determines the time taken by the pulse to travel to hit the breakfast cereal box on the shelf and bounce back to the ultrasound sensor. The image processor 205 determines the distance between the shelving unit and the client device 115 based on the time taken and the speed of sound.

The pixel-to-physical dimension ratio engine 207 may include software and/or logic to provide the functionality for determining a relationship between the pixel dimension of a depicted portion of region in the received image and its actual physical dimensions. In some embodiments, the pixel-to-physical dimension ratio engine 207 can be implemented using hardware including a field-programmable gate array (FPGA) or an application-specific integrated circuit (ASIC). In some embodiments, the pixel-to-physical dimension ratio engine 207 can be implemented using a combination of hardware and software executable by processor 235. In some embodiments, the pixel-to-physical dimension ratio engine 207 is a set of instructions executable by the processor 235. In some implementations, the pixel-to-physical dimension ratio engine 207 is stored in the memory 237 and is accessible and executable by the processor 235. In some implementations, the pixel-to-physical dimension ratio engine 207 is adapted for cooperation and communication with the processor 235, the memory 237 and other components of the image recognition application 103 via the bus 220.

In some embodiments, the pixel-to-physical dimension ratio engine 207 receives the pixel dimension of the interactive graphical geometric shape superimposed over a region depicted in the received image from the image processor 205. For example, as shown in the example of FIG. 3, the pixel-to-physical dimension ratio engine 207 receives a height in pixels for the interactive rectangle superimposed on a shelf in the shelving unit in the received image to be 1079. In some embodiments, the pixel-to-physical dimension ratio engine 207 receives the physical dimensions of the desired region as depicted and superimposed by the interactive graphical geometric shape in the received image. For example, as shown in the example of FIG. 3, the pixel-to-physical dimension ratio 207 receives the physical height of the shelf to be 609.6 mm or two feet. The pixel-to-physical dimension ratio engine 207 determines a pixel-to-physical dimension ratio (PPR) by dividing the dimension, in pixels, of the interactive graphical geometric shape by the physical dimension of the region as depicted and superimposed by the interactive graphical geometric shape in the received image. For example, if the height in pixels for the interactive rectangle superimposed on a shelf in the shelving unit is 1079 and its actual height is 609.6 mm, the pixel-to-physical dimension ratio engine 207 determines the pixel-to-physical dimension ratio using these two parameters to be 1.77.

In another example, the pixel-to-physical dimension ratio engine 207 may determine a pixel-to-physical dimension ratio using a dimension (e.g., height, width, etc.), in pixels, of the interactive graphical geometric shape and a corresponding physical dimension of the region superimposed by the interactive graphical geometric shape. In some embodiments, the pixel-to-physical dimension ratio that is determined using the width, in pixels, may be different from the pixel-to-physical dimension ratio that is determined using the height, in pixels, due to pixel aspect ratio (PAR). The pixel aspect ratio is a mathematical ratio describing how the width of a pixel in an image compares to the height of the pixel. The pixel aspect ratio remains constant for varying sizes of a packaged product in an image in a single image.

In some embodiments, the pixel-to-physical dimension ratio engine 207 stores the pixel-to-physical dimension ratio in the data storage 243. In some embodiments, the pixel-to-physical dimension ratio engine 207 sends the pixel-to-physical dimension ratio to the size engine 209.

The size engine 209 may include software and/or logic to provide the functionality for determining a size of each identified product in the received image. In some embodiments, the size engine 209 can be implemented using hardware including a field-programmable gate array (FPGA) or an application-specific integrated circuit (ASIC). In some embodiments, the size engine 209 can be implemented using a combination of hardware and software executable by processor 235. In some embodiments, the size engine 209 is a set of instructions executable by the processor 235. In some implementations, the size engine 209 is stored in the memory 237 and is accessible and executable by the processor 235. In some implementations, the size engine 209 is adapted for cooperation and communication with the processor 235, the memory 237 and other components of the image recognition application 103 via the bus 220.

In some embodiments, the size engine 209 receives the pixel-to-physical dimension ratio from the pixel-to-physical dimension ratio engine 207 and the pixel dimension of the region of interest of each identified product in the received image from the image processor 205. The size engine 209 determines the size of each identified product in the received image based on the pixel-to-physical dimension ratio and the pixel dimension for each identified product in the received image. In some embodiments, the size engine 209 determines an actual physical dimension corresponding to each identified product by dividing the pixel dimension for each identified product by the candidate pixel-to-physical dimension ratio. The formula to determine the actual physical dimension of a product can be formally stated as:

$$\text{size in physical dimension} = \frac{\text{Size in pixels}}{\text{pixel-to-physical dimension ratio}}$$

For example, as shown in the example of FIG. 7 which is described in more detail below, if the height in pixels for a first "ABC" breakfast cereal box (e.g., product number '1' in FIG. 4) identified in the received image is 400 and the pixel-to-physical dimension ratio is determined to be 1.77, then the actual physical height is determined to be 400/1.77=225.9 mm. In another example, if the height in pixels for a second "ABC" breakfast cereal box (e.g., product number '3' in FIG. 4) identified in the received image is 265 and the pixel-to-physical dimension ratio is determined to be 1.77, then the actual physical height is determined to be 265/1.77=149.7 mm. In yet another example, if the height in pixels for a third "ABC" breakfast cereal box (e.g., product number '7' in FIG. 4) identified in the received image is 175 and the pixel-to-physical dimension ratio is determined to be 1.77, then the actual physical height is determined to be 175/1.77=98.9 mm. In other examples, the size engine 209 may determine other actual physical dimensions such as, width, area, diagonal length, etc. for each identified product in the received image based on corresponding pixel-to-physical dimension ratios determined by the pixel-to-physical dimension ratio engine 207.

In some embodiments, the size engine 209 retrieves the information from the SKU table from the data storage 243. In some embodiments, the size engine 209 uses the physical dimension determined for an identified product in the image to look up a closest matching physical dimension stored for the identified product in the SKU table. The size engine 209 subsequently identifies a corresponding size of the identified product based on the closest match. For example, the size engine 209 identifies that a first "ABC" breakfast cereal box with a calculated physical height of 225.9 mm is closest to a height 225 mm associated with a one kilogram "ABC" breakfast cereal box in the SKU table. In another example, the size engine 209 identifies that a second "ABC" breakfast cereal box with a calculated physical height of 149.7 mm is closest to a height of 150 mm associated with a 500 gram "ABC" breakfast cereal box in the SKU table. In yet another example, the size engine 209 identifies that a third "ABC" breakfast cereal box with a calculated physical height of 98.9 mm is closest to a height of 100 mm associated with a 250 gram "ABC" breakfast cereal box in the SKU table. In some embodiments, the size engine 209 may use other physical dimensions such as, width, area, diagonal height, etc. to improve accuracy in distinguishing the identified products varying only in size in the received image.

In some embodiments, the size engine 209 uses the closest matching physical dimension of each identified product to retrieve stock keeping unit information from the SKU table in the data storage 243. The size engine 209 determines a SKU identifier for the identified product based on the closest matching physical dimension. For example, using the height of 225 mm associated with a one kilogram "ABC" breakfast cereal box, the size engine 209 retrieves a stock keeping unit identifier "X123" from the SKU table for the one kilogram "ABC" breakfast cereal box.

One of the advantages of using the techniques introduced here to distinguish between products of varying size in an image of a retail shelf is that the plurality of products can be audited by a sales executive more quickly and accurately. In some embodiments, the size engine 209 uses the SKU identifier of each identified product in the image to retrieve planogram information corresponding to that product from the data storage 243. The planogram describes a product's location in an aisle and on a shelf and the quantity of the product to be stocked at that location. In some embodiments, the size engine 209 receives the data including identified items of interest in the image from the image processor 205 and determines the location of each of the identified items of interest. The size engine 209 checks whether the location and position of the product of its size identified in the image are compliant with a planogram received from the consumer packaged goods company or companies producing the products. In some embodiments, the size engine 209 instructs the user interface engine 211 to generate a notification for the user when the planogram compliance is breached. For example, a soft drink company planogram may list that soda "A" of two liter volume should be at eye-level in the beverage aisle and the size engine 209 determines whether the identified soda A cans of two liter volume in the query images sent by the user comply with the planogram. One advantage of effecting planogram compliance using the techniques described in this disclosure is increased sales due to the product being in the right place at the right time. Additionally, the customer loyalty to a particular product is not lost as the product is rearranged and/or restocked on the retail shelves to ensure its availability to the customers.

In some embodiments, the size engine 209 determines whether changes in an item inventory of particular sizes identified in the received image exceed a threshold. If the changes exceed a threshold, the size engine 209 instructs the user interface engine 211 to generate a notification for the user. For example, the size engine 209 can determine whether 250 gram size "ABC" breakfast cereal boxes identified in the image of a product shelf are out of stock or nearly empty compared to the one kilogram and 500 gram breakfast cereal boxes based on a planogram. The size engine 209 instructs the user interface engine 211 to notify the user to restock the 250 gram size "ABC" breakfast cereal boxes. In some embodiments, the size engine 209 generates statistics associated with the items of various sizes identified in the image. The statistics could detail the performance of an item of a certain size on the shelf. For example, the statistics may provide details that the 250 gram size breakfast cereal boxes sell faster than those of other sizes, etc. In another example, the statistics may provide details that a promotional sale of tea pack with 20% free tea bags sells faster than other tea packs, etc. Consequently, this is advantageous in that it is easier to infer trends in sales and performances of trade promotions in retail stores which can help retail managers to alter and/or reallocate promotion budgets. In some embodiments, the size engine 209 associates the statistics with the item description in the indices stored in the data storage 243.

The user interface engine 211 may include software and/or logic for providing user interfaces to a user. In some embodiments, the user interface engine 211 can be implemented using hardware including a field-programmable gate array (FPGA) or an application-specific integrated circuit (ASIC).

In some embodiments, the user interface engine 211 can be implemented using a combination of hardware and software executable by processor 235. In some embodiments, the user interface engine 211 is a set of instructions executable by the processor 235. In some implementations, the user interface engine 211 is stored in the memory 237 and is accessible and executable by the processor 235. In some implementations, the user interface engine 211 is adapted for cooperation and communication with the processor 235, the memory 237 and other components of the image recognition application 103 via the bus 220.

In some embodiments, the user interface engine 211 receives instructions from the image processor 205 to generate a graphical interface that instructs the user to capture image of a shelf stocking products. In some embodiments, the user interface engine 211 receives instructions from the image processor 205 to generate a graphical interface that instructs the user to align and superimpose an interactive graphical geometric shape on a region depicted in the image for which physical dimensions may be known. In some embodiments, responsive to a user of a client device 115 capturing the image including products, the user interface engine 211 receives information including product identification from the image processor 205 and generates a polygon outline to identify the region of interest around each identified product. In some embodiments, the user interface engine 211 generates a graphical image for displaying the notification received from the size engine 209. In other embodiments, the user interface engine 211 sends the graphical data to an application (e.g., a browser) in the client device 115 via the communication unit 241 causing the application to display the data in a user interface.

FIG. 3 is a graphical representation 300 of one embodiment of capturing an image of a plurality of products in a shelving unit for retail auditing. In the illustrated embodiment, the graphical representation 300 includes a tablet PC 301 (i.e., a client device 115). The tablet PC 301 can be associated with the user capturing the image 303 of a shelving unit stocking a plurality of products, such as "ABC" breakfast cereal boxes, for auditing. In some embodiments, the image 303 is sent to the image processor 205 for image recognition. The graphical representation 300 includes an interactive rectangle 305 superimposed on a region depicted in the image 303 on the tablet PC 301. In some embodiments, the image processor 205 instructs the user interface engine 211 to generate the interactive rectangle 305. The interactive rectangle 305 is flexible and can be resized by the user input to align over a shelf that is depicted in the image 303 on the tablet PC 301. Once the interactive rectangle 305 is superimposed on the shelf, the user inputs a physical height of two feet for the shelf as depicted in the image 303 and superimposed by the interactive rectangle 305 in the image 303. In the illustrated embodiment, the interactive rectangle 305 is aligned along a physical height of the shelf. In other embodiments, the interactive rectangle 305 may be aligned along a physical width of the shelf. In some embodiments, the image processor 205 identifies a height (in pixels) for the region superimposed by the interactive rectangle 305 in the image 303. The image processor 205 sends the physical height received as user input and the height, in pixels, determined for the region superimposed by the interactive rectangle in the received image to the pixel-to-physical dimension ratio engine 207 for determining a pixel-to-physical dimension ratio.

FIG. 4 is a graphical representation 400 of one embodiment of processing an image of a plurality of products in a shelving unit for image recognition. In the illustrated embodiment, the graphical representation 400 includes a tablet PC 401 (i.e., a client device 115). The tablet PC 401 can be associated with displaying a processed image 403 of a shelving unit stocking a plurality of products. In some embodiments, the image processor 205 generates the processed image 403. In the graphical representation 400, the processed image 403 identifies the "ABC" breakfast cereal boxes with regions of interest 405 in a numbered sequence. The processed image 403 includes the regions of interest 405 bordering each identified "ABC" breakfast cereal product. The regions of interest 405 provide the dimension, in pixels, for each identified product in the processed image 403. The image processor 205 sends the dimension, in pixels, for each identified product to the size engine 209 for determining the size of each identified product.

FIG. 5 is a graphical representation 500 of one embodiment of an example SKU table for mapping a plurality of attributes of a product to the product identity. Referring to FIG. 5, the graphical representation 500 includes a SKU table 501 mapping the "ABC" breakfast cereal product of different varieties as separate row entries in the SKU table 501. Each separate row entry maps the "ABC" breakfast cereal product to the plurality of the attributes associated with the "ABC" breakfast cereal product. The attributes are represented under the columns of the SKU table 401 and may include SKU identifier, product name, height, width, area, diagonal length, size, price, product/item image, etc. In some embodiments, the indexer 203 may update the SKU table 501 with a plurality of row entries to include additional products such as, tea packets, cookies, sodas, etc.

Figure 6:
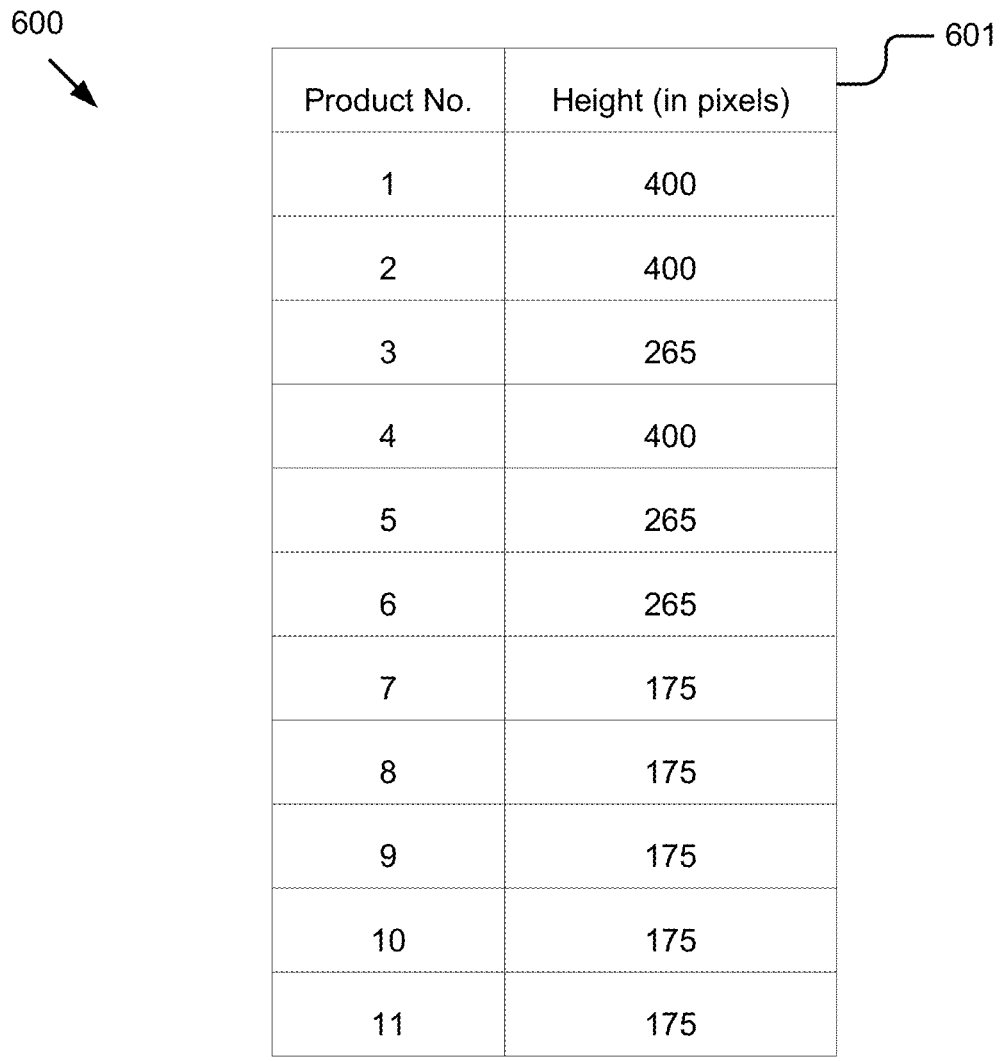
FIG. 6 is a graphical representation of one embodiment of an example pixel dimension table listing dimensions (in pixels) determined for each identified product in the image.

FIG. 6 is a graphical representation 600 of one embodiment of an example pixel dimension table listing dimension (in pixels) determined for each identified product in the image. Referring to FIG. 6, the graphical representation 600 includes a table 601 listing a height, in pixels, of a region of interest associated with each identified product in the processed image 403 from FIG. 4. For example, the first breakfast cereal box in the processed image 403 has an associated height in pixels of 400. In some embodiments, the image processor 205 generates the table 601 listing the height, in pixels. In other examples, the table 601 may include a width, a diagonal length, an area, etc. as additional columns.

FIG. 7 is a graphical representation 700 of one embodiment of an example physical dimension table listing actual physical dimensions of identified products in the image. Referring to FIG. 7, the graphical representation 700 includes a table 701 that lists actual physical height by dividing the dimension, in pixels, for each identified product by the pixel-to-physical dimension ratio. For example, if the height in pixels for a first "ABC" breakfast cereal box identified in the processed image 403 in FIG. 4 is 400 and the pixel-to-physical dimension ratio is determined to be 1.77, then the actual physical height of the first breakfast cereal box is determined to be 400/1.77=225.9 mm. In some embodiments, the size engine 209 uses the actual physical height corresponding to each identified product to lookup the SKU table for distinguishing the sizes of each identified product in the processed image 403. For example, the size engine 209 identifies that the first "ABC" breakfast cereal box with a calculated physical height of 225.9 mm matches closely to a physical height of 225 mm stored for the "ABC" breakfast cereal boxes in the SKU table. The matched physical height of 225 mm in turn maps to a one kilogram "ABC" breakfast cereal box in the SKU table.

FIG. 8 is a graphical representation 800 of one embodiment for determining a height of the shelving unit from an image of the shelving unit. Referring to FIG. 8, the graphical representation 800 describes the relationship between distance of the shelving unit from the camera, the angle of aperture of the camera, and the height of a region covered by the camera in the image of the shelving unit. If the distance of the shelving unit from the camera and the angle of aperture of the camera is known, then the height of the region depicted in the image of the shelving unit can be formally stated as:

$$h = 2*d*\tan\left(\frac{\theta}{2}\right)$$

where 'h' is the height of the region covered by the camera as depicted in the image, 'd' is the distance of the camera from the shelving unit and 'θ' is the aperture angle of the camera that captured the image of the shelving unit. In some embodiments, the value of height determined based on the above formula can only be accurate if the focal plane of the camera is parallel to the object of interest (i.e. shelving unit). The physical height of the captured region thus determined and the height in pixels of the captured region in the image are used in determining a pixel-to-physical dimension ratio. The pixel-to-physical dimension ratio describes a relationship between the pixel dimension of the captured region of the shelving unit and the physical dimension of the captured region of the shelving unit in the image.

Figure 9A:
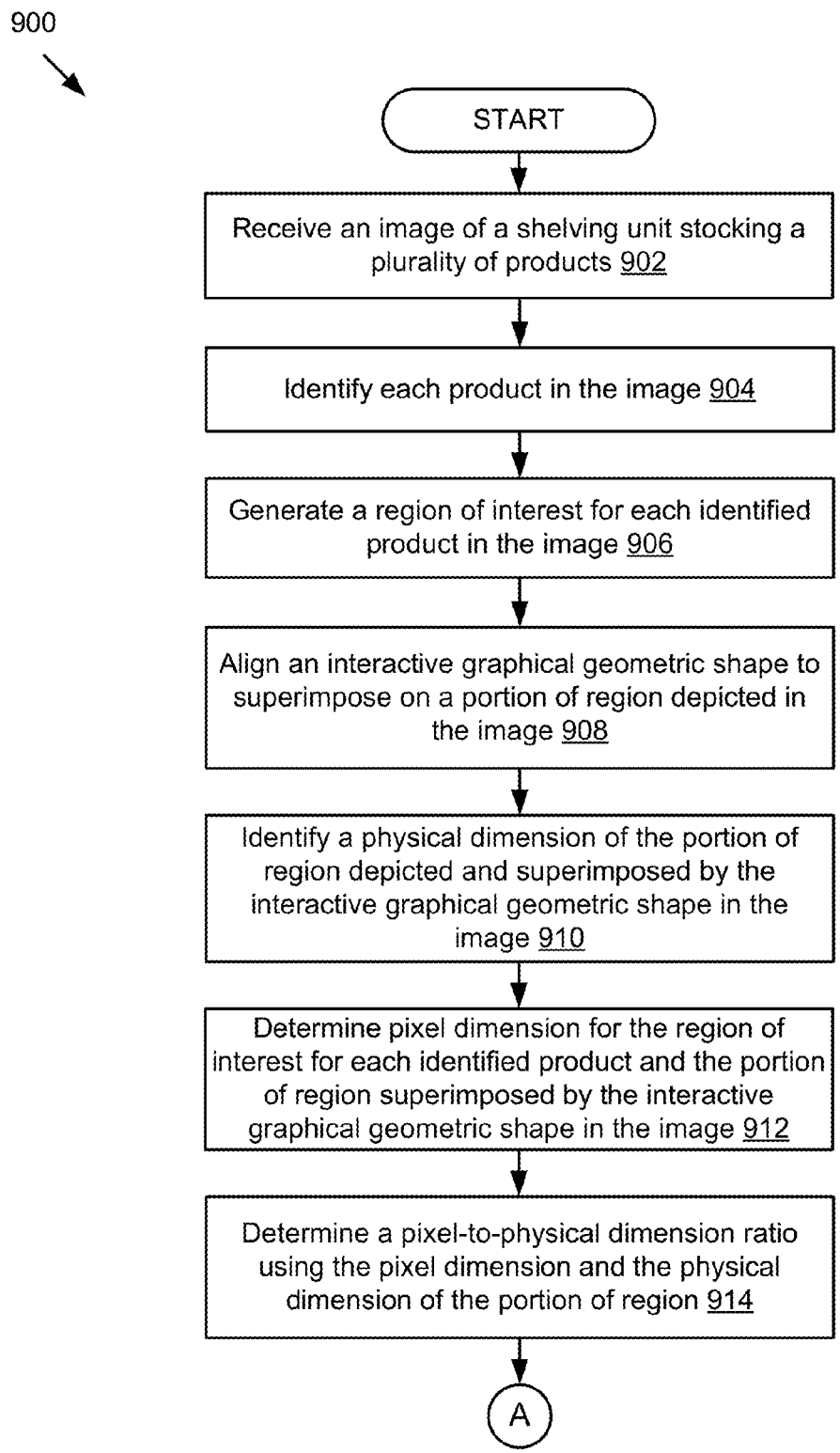
FIGS. 9A-9B are flow diagrams illustrating one embodiment of determining a stock keeping unit identifier of each identified product in the image of plurality of products.
Figure 9B:
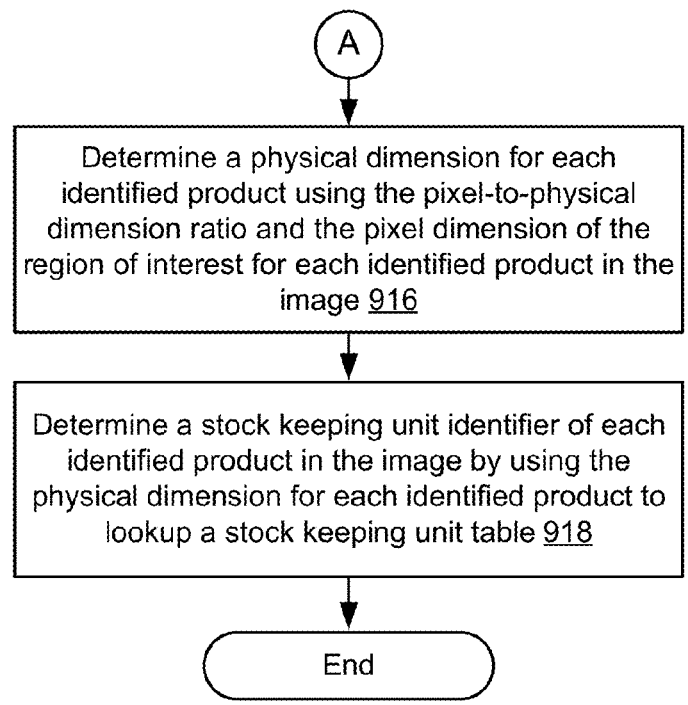

FIGS. 9A-9B are flow diagrams of one embodiment of a method 900 for determining a stock keeping unit identifier of each identified product in the image of plurality of products. In some embodiments, the image recognition application 103 may include an image processor 205, a pixel-to-physical dimension ratio engine 207, and a size engine 209. At 902, the image processor 205 receives an image of a shelving unit stocking a plurality of products. The image may be received for recognition and may include multiple items of interest. For example, the image can be an image of a plurality of packaged products in a shelving unit (e.g., a square coffee box, a rectangular cereal box, a cylindrical package of chocolate chip cookies, etc.) in a retail store. At 904, the image processor 205 identifies each product in the image. The image processor 205 extracts features from the image including the plurality of products and matches the extracted features to those features stored in a database for recognition. At 906, the image processor 205 generates a region of interest for each identified product in the image. For example, the image processor 205 identifies 11 "ABC" breakfast cereal boxes in an image and returns 11 rectangular polygon ROIs bordering each one of the identified items. At 908, the image processor 205 aligns an interactive graphical geometric shape to superimpose on a portion of region depicted in the image. The image processor 205 receives input from the user to align the interactive graphical geometric shape to superimpose on a desired region depicted in the received image for which the physical dimensions may be known. For example, the image processor 205 instructs the user interface engine 211 to generate an interactive rectangle to be superimposed on a region depicted in the image on the display of the client device 115. At 910, the image processor 205 identifies a physical dimension of the portion of region depicted and superimposed by the interactive graphical geometric shape in the image. For example, the image processor 205 receives as a user input a height for the shelving unit superimposed by the interactive rectangle to be six feet. In another example, the image processor 205 receives as user input a height for a shelf in the shelving unit that is superimposed by the interactive rectangle to be two feet or 609.6 mm. At 912, the image processor 205 determines pixel dimension for the region of interest for each identified product and the portion of region superimposed by the interactive graphical geometric shape in the image. For example, the image processor 205 determines the height (in pixels) of the interactive rectangle superimposed on the shelf in the shelving unit and the height (in pixels) of the breakfast cereal boxes identified in the image. In other examples, the image processor 205 may determine a width in pixels, an area in pixels, a diagonal length in pixels, etc.

At 914, the pixel-to-physical dimension ratio engine 207 determines a pixel-to-physical dimension ratio using the pixel dimension and the physical dimension of the portion of region. For example, if the height in pixels of the interactive rectangle superimposed on a shelf in the shelving unit in the image is 1079, then the pixel-to-physical dimension ratio 207 divides the height, in pixels, 1079 by the actual height of 609.6 mm and determines the pixel-to-physical dimension ratio to be 1.77. The pixel-to-physical dimension ratio of 1.77 that is determined can be used to identify the sizes of identified items in the image.

At 916, the size engine 209 determines a physical dimension for each identified product using the pixel-to-physical dimension ratio and the pixel dimension of the region of interest for each identified product in the image. The size engine 209 determines a physical dimension corresponding to each identified product by dividing the pixel dimension for each identified product by the pixel-to-physical dimension ratio. For example, if the height in pixels for a breakfast cereal box identified in the received image is 400 and the pixel-to-physical dimension ratio is determined to be 1.77, then the actual physical height is determined to be 400/1.77=225.9 mm. At 918, the size engine 209 determines a SKU identifier of each identified product in the image by using the physical dimension for each identified product to lookup a SKU table. For example, the size engine 209 identifies that the "ABC" breakfast cereal box with a calculated physical height of 225.9 mm is closest to a height of 225 mm associated with a one kilogram "ABC" breakfast cereal box in the SKU table and retrieves the SKU identifier "X123" for the one kilogram "ABC" breakfast cereal box.

Figure 10A:
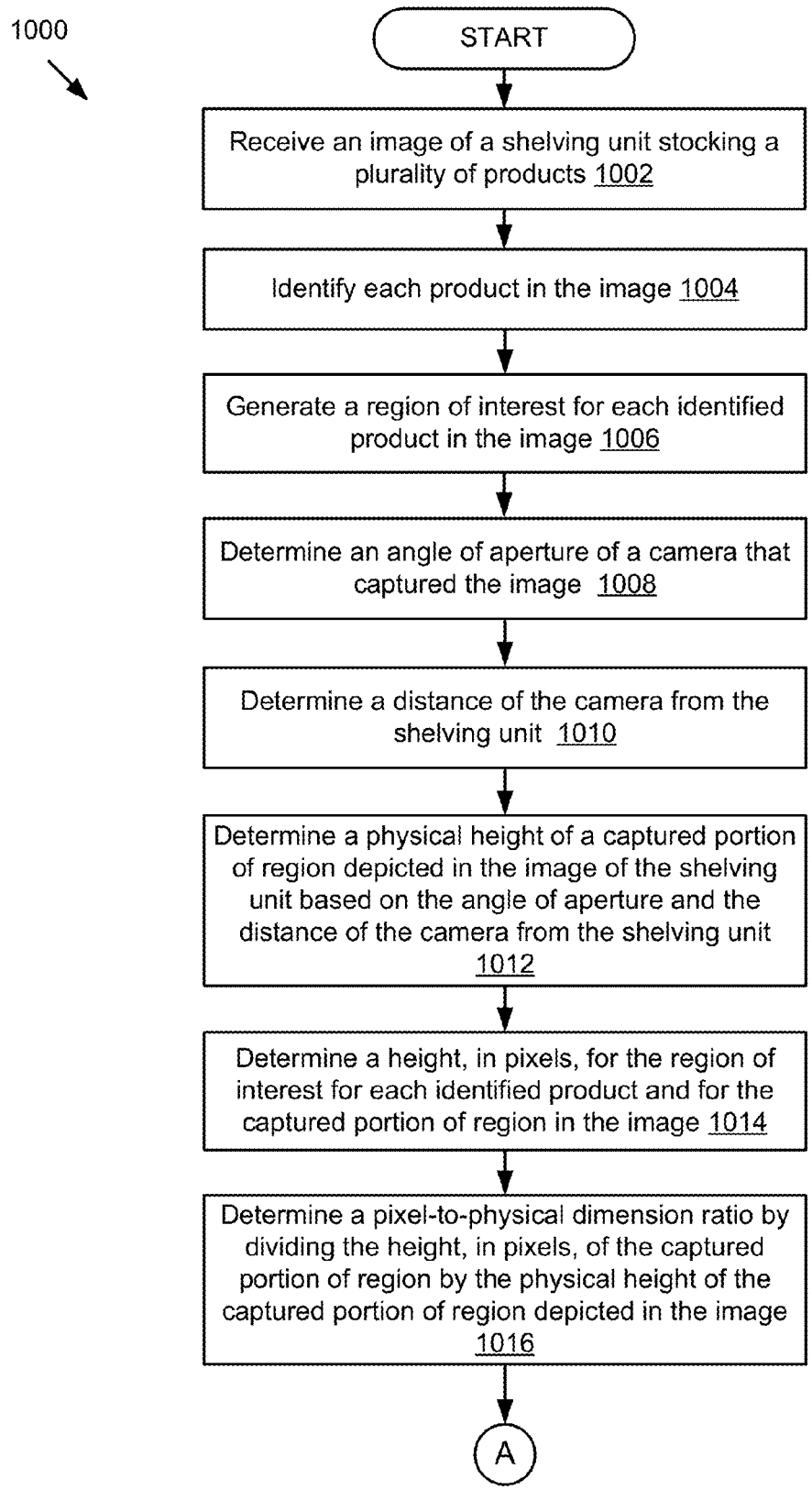
FIG. 10A-10B are flow diagrams illustrating another embodiment of determining a stock keeping unit identifier of each identified product in the image of plurality of products.
Figure 10B:
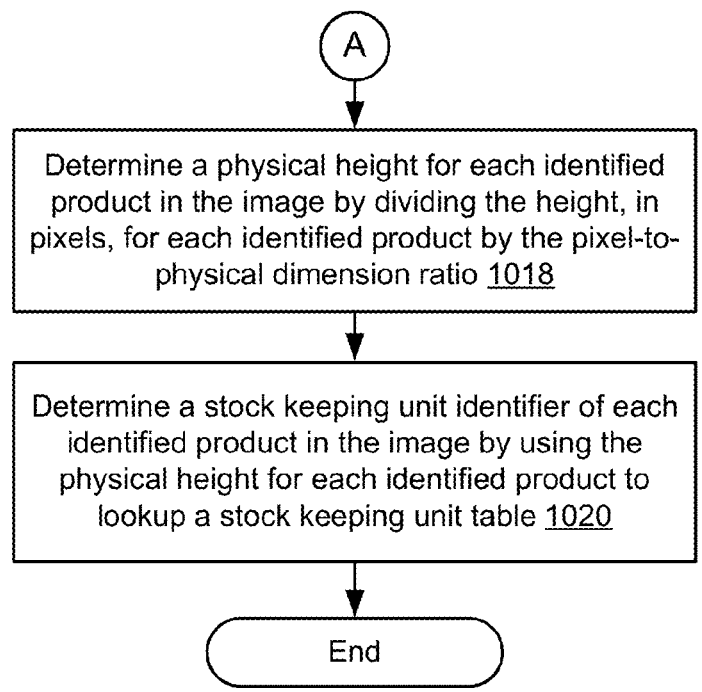

FIGS. 10A-10B are flow diagrams of another embodiment of a method 1000 for determining a size of each identified product in the image of plurality of products. In some embodiments, the image recognition application 103 may include an image processor 205, a pixel-to-physical dimension ratio engine 207, and a size engine 209. At 1002, the image processor 205 receives an image of a shelving unit stocking a plurality of products. For example, the image may be of a shelving unit stocking breakfast cereal boxes in a retail supermarket. At 1004, the image processor 205 identifies each product in the image. The image processor 205 extracts features from the received image including the plurality of products and matches the extracted features to those features stored in a database table for recognition. For example, the image processor 205 identifies 11 "ABC" breakfast cereal boxes in the image. At 1006, the image processor 205 generates a region of interest for each identified product in the image. For example, the image processor 205 returns 11 rectangular polygon ROIs bordering each one of the 11 "ABC" breakfast cereal boxes in the image. At 1008, the image processor 205 determines an angle of aperture of a camera that captured the image. The camera is an example of the client device 115. The aperture angle of the client device 115 is the apparent angle of the lens aperture as seen from the focal point. For example, the image processor 205 identifies the aperture angle from camera specifications stored in the data storage 243.

At 1010, the image processor 205 determines a distance of the camera from the shelving unit. In some embodiments, the image processor 205 instructs the user interface engine 211 to generate graphical data for instructing the user to capture an image of the base of the shelving unit to determine the distance of the client device 115 from the shelving unit. The image processor 205 determines an angle of tilt of the client device 115 in order to position the base of the shelving unit at the center and middle of the image. The image processor 205 approximates a height of the client device 115 off the ground as a height of the user using the client device 115 and the image processor 205 receives the height of the user as an input. The image processor 205 determines the distance of the shelving unit from the client device 115 by multiplying the height of the client device 115 off the ground with a tangent of the angle of tilt of the client device 115. In some embodiments, the image processor 205 determines an item of interest on the shelving unit that is in focus in the image captured by the client device 115. The image processor 205 determines a distance of the client device 115 from the shelving unit based on the distance of the item of interest that is in focus in the image from the client device 115. The image processor 205 may communicate with the built-in functions of the client device 115 and can access raw distance data measured by the client device 115 while focusing on an item of interest. For example, the image processor 205 can make an application programming interface (API) call to retrieve the estimated distance between the camera in a smartphone and the item of interest in focus. In some embodiments, the image processor 205 determines a distance of the item of interest on the shelving unit from the client device 115 by triggering a burst of ultrasound pulse from an ultrasound sensor (for e.g., coupled to the client device 115) and listening for the echo when it bounces off the item of interest. The image processor 205 determines the distance between the shelving unit and the client device 115 based on a time taken by the ultrasound pulse to travel to hit the item of interest on the shelving unit and bounce back to the ultrasound sensor and the speed of sound.

At 1012, the image processor 205 determines a physical height of a captured portion of region depicted in the image of the shelving unit based on the angle of aperture and the distance of the camera from the shelving unit. The formula to determine the physical height of captured portion of region can be formally stated as:

$$h = 2 * d * \tan\left(\frac{\theta}{2}\right)$$

where 'h' is the height of the region covered by the client device 115 in the image, 'd' is the distance of the client device 115 from the shelving unit and 'θ' is the aperture angle of the client device 115 that captured the image. At 1014, the image processor 205 determines a height, in pixels, for the region of interest for each identified product and for the captured portion of region of interest in the image. For example, the image processor 205 determines the height in pixels of three predominantly sized breakfast cereal boxes identified in the image to be 400, 265, and 175 respectively.

At 1016, the pixel-to-physical dimension ratio engine 207 determines a pixel-to-physical dimension ratio by dividing the height, in pixels, of the captured portion of region by the physical height of the captured portion of region depicted in the image. For example, if the height in pixels for captured portion of region from the image is 1079 and the actual height of the captured portion of region depicted in the image is 609.6 mm, the pixel-to-physical dimension ratio engine 207 determines the pixel-to-physical dimension ratio using these two parameters to be 1.77.

At 1018, the size engine 209 determines a physical height for each identified product in the image by dividing the dimension, in pixels, for each identified product by the pixel-to-physical dimension ratio. For example, if the height in pixels for a first breakfast cereal box identified in the received image is 400 and the pixel-to-physical dimension ratio is determined to be 1.77, then the actual physical height is determined to be 400/1.77=225.9 mm. At 1020, the size engine 209 determines a SKU identifier of each identified product in the image by using the physical height for each identified product to lookup a SKU table. For example, the size engine 209 identifies that the first "ABC" breakfast cereal box with a calculated physical height of 225.9 mm is closest to a height of 225 mm associated with a one kilogram "ABC" breakfast cereal box in the SKU table and retrieves the SKU identifier "X123" for the one kilogram "ABC" breakfast cereal box from the SKU table.

A system and method for identifying and distinguishing between products of similar appearance that vary in size has been described. In the above description, for purposes of explanation, numerous specific details are set forth in order to provide a thorough understanding of the techniques introduced above. It will be apparent, however, to one skilled in the art that the techniques can be practiced without these specific details. In other instances, structures and devices are shown in block diagram form in order to avoid obscuring the description and for ease of understanding. For example, the techniques are described in one embodiment above primarily with reference to software and particular hardware. However, the present invention applies to any type of computing system that can receive data and commands, and present information as part of any peripheral devices providing services.

Reference in the specification to "one embodiment" or "an embodiment" means that a particular feature, structure, or characteristic described in connection with the embodiment is included in at least one embodiment. The appearances of the phrase "in one embodiment" in various places in the specification are not necessarily all referring to the same embodiment.

Some portions of the detailed descriptions described above are presented in terms of algorithms and symbolic representations of operations on data bits within a computer memory. These algorithmic descriptions and representations are, in some circumstances, used by those skilled in the data processing arts to convey the substance of their work to others skilled in the art. An algorithm is here, and generally, conceived to be a self-consistent sequence of steps leading to a desired result. The steps are those requiring physical manipulations of physical quantities. Usually, though not necessarily, these quantities take the form of electrical or magnetic signals capable of being stored, transferred, combined, compared, and otherwise manipulated. It has proven convenient at times, principally for reasons of common usage, to refer to these signals as bits, values, elements, symbols, characters, terms, numbers or the like.

It should be borne in mind, however, that all of these and similar terms are to be associated with the appropriate physical quantities and are merely convenient labels applied to these quantities. Unless specifically stated otherwise as apparent from the following discussion, it is appreciated that throughout the description, discussions utilizing terms such as "processing", "computing", "calculating", "determining", "displaying", or the like, refer to the action and processes of a computer system, or similar electronic computing device, that manipulates and transforms data represented as physical (electronic) quantities within the computer system's registers and memories into other data similarly represented as physical quantities within the computer system memories or registers or other such information storage, transmission or display devices.

The techniques also relate to an apparatus for performing the operations herein. This apparatus may be specially constructed for the required purposes, or it may comprise a general-purpose computer selectively activated or reconfigured by a computer program stored in the computer. Such a computer program may be stored in a computer readable storage medium, such as, but is not limited to, any type of disk including floppy disks, optical disks, CD-ROMs, and magnetic disks, read-only memories (ROMs), random access memories (RAMs), EPROMs, EEPROMs, magnetic or optical cards, flash memories including USB keys with non-volatile memory or any type of media suitable for storing electronic instructions, each coupled to a computer system bus.

Some embodiments can take the form of an entirely hardware embodiment, an entirely software embodiment or an embodiment containing both hardware and software elements. One embodiment is implemented in software, which includes but is not limited to firmware, resident software, microcode, etc.

Furthermore, some embodiments can take the form of a computer program product accessible from a computer-usable or computer-readable medium providing program code for use by or in connection with a computer or any instruction execution system. For the purposes of this description, a computer-usable or computer readable medium can be any apparatus that can contain, store, communicate, propagate, or transport the program for use by or in connection with the instruction execution system, apparatus, or device.

A data processing system suitable for storing and/or executing program code can include at least one processor coupled directly or indirectly to memory elements through a system bus. The memory elements can include local memory employed during actual execution of the program code, bulk storage, and cache memories which provide temporary storage of at least some program code in order to reduce the number of times code must be retrieved from bulk storage during execution.

Input/output or I/O devices (including but not limited to keyboards, displays, pointing devices, etc.) can be coupled to the system either directly or through intervening I/O controllers.

Network adapters may also be coupled to the system to enable the data processing system to become coupled to other data processing systems or remote printers or storage devices through intervening private or public networks. Modems, cable modem and Ethernet cards are just a few of the currently available types of network adapters.

Finally, the algorithms and displays presented herein are not inherently related to any particular computer or other apparatus. Various general-purpose systems may be used with programs in accordance with the teachings herein, or it may prove convenient to construct more specialized apparatus to perform the required method steps. The required structure for a variety of these systems will appear from the description below. In addition, the techniques are not described with reference to any particular programming language. It will be appreciated that a variety of programming languages may be used to implement the teachings of the various embodiments as described herein.

The foregoing description of the embodiments has been presented for the purposes of illustration and description. It is not intended to be exhaustive or to limit the specification to the precise form disclosed. Many modifications and variations are possible in light of the above teaching. It is intended that the scope of the embodiments be limited not by this detailed description, but rather by the claims of this application. As will be understood by those familiar with the art, the examples may be embodied in other specific forms without departing from the spirit or essential characteristics thereof. Likewise, the particular naming and division of the modules, routines, features, attributes, methodologies and other aspects are not mandatory or significant, and the mechanisms that implement the description or its features may have different names, divisions and/or formats. Furthermore, as will be apparent to one of ordinary skill in the relevant art, the modules, routines, features, attributes, methodologies and other aspects of the specification can be implemented as software, hardware, firmware or any combination of the three. Also, wherever a component, an example of which is a module, of the specification is implemented as software, the component can be implemented as a standalone program, as part of a larger program, as a plurality of separate programs, as a statically or dynamically linked library, as a kernel loadable module, as a device driver, and/or in every and any other way known now or in the future to those of ordinary skill in the art of computer programming. Additionally, the specification is in no way limited to embodiment in any specific programming language, or for any specific operating system or environment. Accordingly, the disclosure is intended to be illustrative, but not limiting, of the scope of the specification, which is set forth in the following claims.

What is claimed is:

1. A method comprising:
receiving, by an image processor, an image including a shelving unit stocking a plurality of items;
identifying, by the image processor, each item in the image;
generating, by the image processor, a region of interest for each identified item in the image;
identifying, by the image processor, a physical dimension of a portion of region depicted in the image;
determining, by the image processor, a dimension of the region of interest for each identified item and for the portion of region in the image, wherein the dimension is expressed in pixels;
determining, by a pixel-to-physical dimension ratio engine, a pixel-to-physical dimension ratio using the dimension of the portion of region and the physical dimension of the portion of region depicted in the image; and
determining, by a size engine, a stock keeping unit identifier of each identified item in the image based on the pixel-to-physical dimension ratio and the dimension of the region of interest for each identified item.

2. The method of claim 1 wherein identifying the physical dimension of the portion of region depicted in the image further comprises:
receiving, by the image processor, a first input from a user to align an interactive graphical geometric shape to superimpose on the portion of region depicted in the image; and
receiving, by the image processor, a second input from the user indicating the physical dimension of the portion of region superimposed by the interactive graphical geometric shape.

3. The method of claim 1 wherein identifying the physical dimension of the portion of region depicted in the image further comprises:
- determining, by the image processor, an angle of aperture of a camera that captured the image including the shelving unit;
- determining, by the image processor, a distance of the camera from the shelving unit; and
- determining, by the image processor, the physical dimension of the portion of region depicted in the image based on the angle of aperture and the distance of the camera from the shelving unit.

4. The method of claim 1 wherein determining the pixel-to-physical dimension ratio further comprises:
- determining, by the pixel-to-physical dimension ratio engine, the pixel-to-physical dimension ratio by dividing the dimension of the portion of region expressed in pixels by the physical dimension of the portion of region depicted in the image.

5. The method of claim 1 wherein determining the stock keeping unit identifier of each identified item in the image further comprises:
- determining, by the size engine, a physical dimension corresponding to each identified item by dividing the dimension of the region of interest expressed in pixels by the pixel-to-physical dimension ratio; and
- determining, by the size engine, the stock keeping unit identifier of each identified item by using the physical dimension to lookup the stock keeping unit identifier in a stock keeping unit table.

6. The method of claim 1 wherein the portion of region depicted in the image includes one from the group of a shelf, a shelving unit, and a whole region depicted in the image.

7. The method of claim 1 wherein the distance of the camera from the shelving unit is determined based on an ultrasonic sensor.

8. The method of claim 5 wherein the physical dimension is one from the group of: a height, a width, an area, and a diagonal length.

9. The method of claim 1 wherein a portion of the plurality of items have a similar item surface appearance.

10. The method of claim 1 wherein a portion of the plurality of items vary only in size.

11. A system comprising;
- an image processor configured to receive an image including a shelving unit stocking a plurality of items, to identify each item in the image, to generate a region of interest for each identified item in the image, to identify a physical dimension of a portion of region depicted in the image, and to determine a dimension of the region of interest for each identified item and for the portion of region in the image, wherein the dimension is expressed in pixels;
- a pixel-to-physical dimension ratio engine coupled to the image processor and configured to determine a pixel-to-physical dimension ratio using the dimension of the portion of region and the physical dimension of the portion of region depicted in the image; and
- a size engine coupled to the pixel-to-physical dimension ratio engine and configured to determine a stock keeping unit identifier of each identified item in the image based on the pixel-to-physical dimension ratio and the dimension of the region of interest for each identified item.

12. The system of claim 11 wherein the image processor to identify the physical dimension of the portion of region depicted in the image is further configured to receive a first input from a user to align an interactive graphical geometric shape to superimpose on the portion of region depicted in the image and to receive a second input from the user indicating the physical dimension of the portion of region superimposed by the interactive graphical geometric shape.

13. The system of claim 11 wherein the image processor to identify the physical dimension of the portion of region depicted in the image is further configured to determine an angle of aperture of a camera that captured the image including the shelving unit, to determine a distance of the camera from the shelving unit, and to determine the physical dimension of the portion of region depicted in the image based on the angle of aperture and the distance of the camera from the shelving unit.

14. The system of claim 11 wherein the pixel-to-physical dimension ratio engine to determine the pixel-to-physical dimension ratio is further configured to determine the pixel-to-physical dimension ratio by dividing the dimension of the portion of region expressed in pixels by the physical dimension of the portion of region depicted in the image.

15. The system of claim 11 wherein the size engine to determine the stock keeping unit identifier of each identified item in the image is further configured to determine a physical dimension corresponding to each identified item by dividing the dimension of the region of interest expressed in pixels by the pixel-to-physical dimension ratio and to determine the stock keeping unit identifier of each identified item by using the physical dimension to lookup the stock keeping unit identifier in a stock keeping unit tables.

16. A computer program product comprising a non-transitory computer readable medium storing a computer readable program, wherein the computer readable program when executed causes a computer to perform operations comprising:
- receiving an image including a shelving unit stocking a plurality of items;
- identifying each item in the image;
- generating a region of interest for each identified item in the image;
- identifying a physical dimension of a portion of region depicted in the image;
- determining a dimension of the region of interest for each identified item and for the portion of region in the image, wherein the dimension is expressed in pixels;
- determining a pixel-to-physical dimension ratio using the dimension of the portion of region and the physical dimension of the portion of region depicted in the image; and
- determining a stock keeping unit identifier of each identified item in the image based on the pixel-to-physical dimension ratio and the dimension of the region of interest for each identified item.

17. The computer program product of claim 16 wherein identifying the physical dimension of the portion of region depicted in the image further comprises:
- receiving a first input from a user to align an interactive graphical geometric shape to superimpose on the portion of region depicted in the image; and
- receiving a second input from the user indicating the physical dimension of the portion of region superimposed by the interactive graphical geometric shape.

18. The computer program product of claim 16 wherein identifying the physical dimension of the portion of region depicted in the image further comprises:
- determining an angle of aperture of a camera that captured the image including the shelving unit;
- determining a distance of the camera from the shelving unit; and determining the physical dimension of the portion of region depicted in the image based on the angle of aperture and the distance of the camera from the shelving unit.

19. The computer program product of claim 16 wherein determining the pixel-to-physical dimension ratio further comprises:

determining the pixel-to-physical dimension ratio by dividing the dimension of the portion of region expressed in pixels by the physical dimension of the portion of region depicted in the image.

20. The computer program product of claim 16 wherein determining the stock keeping unit identifier of each identified item in the image further comprises:

determining a physical dimension corresponding to each identified item by dividing the dimension of the region of interest expressed in pixels by the pixel-to-physical dimension ratio; and determining the stock keeping unit identifier of each identified item by using the physical dimension to lookup the stock keeping unit identifier in a stock keeping unit table.

* * * * *